(12) United States Patent
Kanamori et al.

(10) Patent No.: US 7,623,174 B2
(45) Date of Patent: Nov. 24, 2009

(54) IMAGING DEVICE FOR MULTI-RESOLUTION VIDEO DATA

(75) Inventors: Katsuhiro Kanamori, Nara (JP); Hiroyoshi Komobuchi, Kyoto (JP); Hideto Motomura, Nara (JP); Kenji Kondo, Kyoto (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/990,589

(22) PCT Filed: Sep. 6, 2006

(86) PCT No.: PCT/JP2006/317648

§ 371 (c)(1),
(2), (4) Date: Feb. 15, 2008

(87) PCT Pub. No.: WO2007/029738

PCT Pub. Date: Mar. 15, 2007

(65) Prior Publication Data

US 2008/0309780 A1    Dec. 18, 2008

(51) Int. Cl.
H04N 3/14 (2006.01)
H04N 5/335 (2006.01)
H04N 5/228 (2006.01)

(52) U.S. Cl. ................................. 348/304; 348/222.1

(58) Field of Classification Search ............. 348/222.1, 348/294, 302, 303, 304, 305, 307, 308
See application file for complete search history.

(56) References Cited

U.S. PATENT DOCUMENTS

| | | | |
|---|---|---|---|
| 5,043,821 A | * | 8/1991 | Suga et al. .................. 348/320 |
| 6,204,879 B1 | | 3/2001 | Koseki et al. |
| 6,714,249 B2 | * | 3/2004 | May et al. .................... 348/373 |
| 6,906,751 B1 | * | 6/2005 | Norita et al. ................ 348/349 |
| 2004/0145666 A1 | * | 7/2004 | Murata et al. ............... 348/272 |
| 2004/0145668 A1 | * | 7/2004 | Iwasawa et al. ............. 348/301 |
| 2005/0168589 A1 | * | 8/2005 | Silverstein et al. ........ 348/220.1 |

FOREIGN PATENT DOCUMENTS

| | | |
|---|---|---|
| JP | 2-65380 A | 3/1990 |
| JP | 10-276367 A | 10/1998 |
| JP | 2000-32318 A | 1/2000 |
| JP | 2004-32100 A | 1/2004 |
| JP | 2004-180240 | 6/2004 |
| JP | 2004-282242 A | 10/2004 |
| JP | 2005-12403 A | 1/2005 |
| WO | WO 03/084207 A2 | 10/2003 |

\* cited by examiner

*Primary Examiner*—Sinh Tran
*Assistant Examiner*—Albert H Cutler
(74) *Attorney, Agent, or Firm*—Harness, Dickey & Pierce, P.L.C.

(57) ABSTRACT

For a first region being a portion of a storage section (202), a read-out pulse produced by a progressive scanning shift register (206) is used to perform a progressive read-out operation of reading out signals from all rows of image-storing pixels (221). For a second region including an entire region other than the first region, a read-out pulse produced by a skip scanning shift register (205) is used to perform a skip read-out operation of reading out signals from intermittently-selected rows of image-storing pixels (221). The progressive scanning shift register (206) produces the read-out pulse so that the first region moves every frame and an entire region of the storage section (202) is scanned over a plurality of frames.

5 Claims, 23 Drawing Sheets

<Resolution increasing process>

(B)

(D)

(A)

(C)

Where n=4

Y(1,3,0,2)

Where n=5

Y(1,4,2,0,3)

IMAGING DEVICE FOR MULTI-RESOLUTION VIDEO DATA

TECHNICAL FIELD

The present invention relates to an imaging device, and more particularly to an imaging device used for obtaining video data in which different pixel resolutions coexist within the same screen.

BACKGROUND ART

The following conventional configurations have been proposed in the art for obtaining video data in which different pixel resolutions coexist within the same screen.

Patent Document 1 discloses an image input device capable of simultaneously obtaining, from the same frame, overall image information, which is obtained by sub-sampled scanning, and high-resolution partial image information, which is obtained by all-pixel scanning. Specifically, scanning control means performs all-pixel scanning only on a group of pixels in a predetermined continuous region of the pixel array, and performs sub-sampled scanning on a group of pixels in the remaining region of the pixel array.

Patent Document 2 discloses an image input device capable of obtaining a low-resolution overall image and a high-resolution partial image simultaneously and at a high speed. Specifically, the device includes a low-resolution overall image scanning section for outputting low-resolution overall image data and a high-resolution partial image scanning section for outputting a high-resolution partial image data, wherein these sections are switched from one another within a predetermined frame period so as to successively output the low-resolution overall image data and the high-resolution partial image data. The position from which the high-resolution partial image is to be cut out in the next frame is automatically determined based on the low-resolution overall image data.

Patent Document 1: Japanese Laid-Open Patent Publication No. 2000-32318
Patent Document 2: Japanese Laid-Open Patent Publication No. 2004-180240

DISCLOSURE OF THE INVENTION

Problems to be Solved by the Invention

However, the conventional techniques have the following problems.

According to the technique disclosed in Patent Document 1, an all-pixel scanning region and a sub-sampled scanning region are contained within the same screen. However, the all-pixel scanning region is fixed to a predetermined position. Therefore, a process of obtaining the high-resolution partial image information for the entire frame by changing the position of the all-pixel scanning region every frame, for example, cannot be realized, and such a process is not even contemplated.

Also with the sub-sampled scanning, the position to be scanned is set to a predetermined position in advance. Therefore, the overall image information obtained by sub-sampled scanning is formed from image data of the same scanning position in every frame, whereby the image quality may degrade.

In Patent Document 2, the position from which the high-resolution partial image is to be cut out in each frame is not fixed, but is automatically determined based on the low-resolution overall image data in the previous frame. Thus, the position of the high-resolution partial image changes every frame. However, a process of intentionally moving the position of the high-resolution partial image in order to obtain the high-resolution partial image for the entire frame, for example, cannot be realized, and such a process is not even contemplated.

Also with the low-resolution overall image data, the position to be scanned is set to a predetermined position in advance. Therefore, the low-resolution overall image data is formed from image data of the same scanning position in every frame, whereby the image quality may degrade.

In view of the problems set forth above, it is an object of the present invention to provide an imaging device for obtaining video data in which different pixel resolutions coexist within the same screen, wherein the information of the high-resolution image portion can be obtained for the entire frame.

It is also an object of the present invention to provide an imaging device for obtaining video data in which different pixel resolutions coexist within the same screen, wherein the image quality is improved for the low-resolution image portion.

Means for Solving the Problems

In the present invention, for a first region being a portion of a storage section in which image-storing pixels are arranged in a two-dimensional arrangement, a read-out pulse produced by a progressive scanning shift register is used to perform a progressive read-out operation of reading out signals from all rows of image-storing pixels. For a second region including an entire region other than the first region, a read-out pulse produced by a skip scanning shift register is used to perform a skip read-out operation of reading out signals from intermittently-selected rows of image-storing pixels. As a result, a high-resolution image is obtained for the first region, and a low-resolution image having a lower resolution is obtained for the second region.

The progressive scanning shift register produces the read-out pulse so that the first region moves every frame and the first region scans an entire region of the storage section over a plurality of frames. Therefore, the first region for which the high-resolution image is obtained is moved every frame so that the entire frame is scanned over a plurality of frames. Therefore, it is possible to obtain information of the high-resolution image portion for the entire frame.

Alternatively, the skip scanning shift register produces the read-out pulse so that positions of the intermittently-selected rows move every frame. Therefore, in the second region for which the low-resolution image is obtained, the row from which an image is read out moves every frame. Therefore, a so-called "interlaced read-out operation" is realized, thus improving the image quality of the low-resolution image portion.

Effects of the Invention

According to the present invention, the first region for which the high-resolution image is obtained moves every frame so as to scan the entire frame over a plurality of frames, whereby it is possible to obtain information of the high-resolution image portion for the entire frame. In the second region for which the low-resolution image is obtained, the row from which the image is read out moves every frame, thereby realizing a so-called "interlaced read-out operation", thus improving the image quality of the low-resolution image portion.

DESCRIPTION OF REFERENCE NUMERALS

Figure 1:
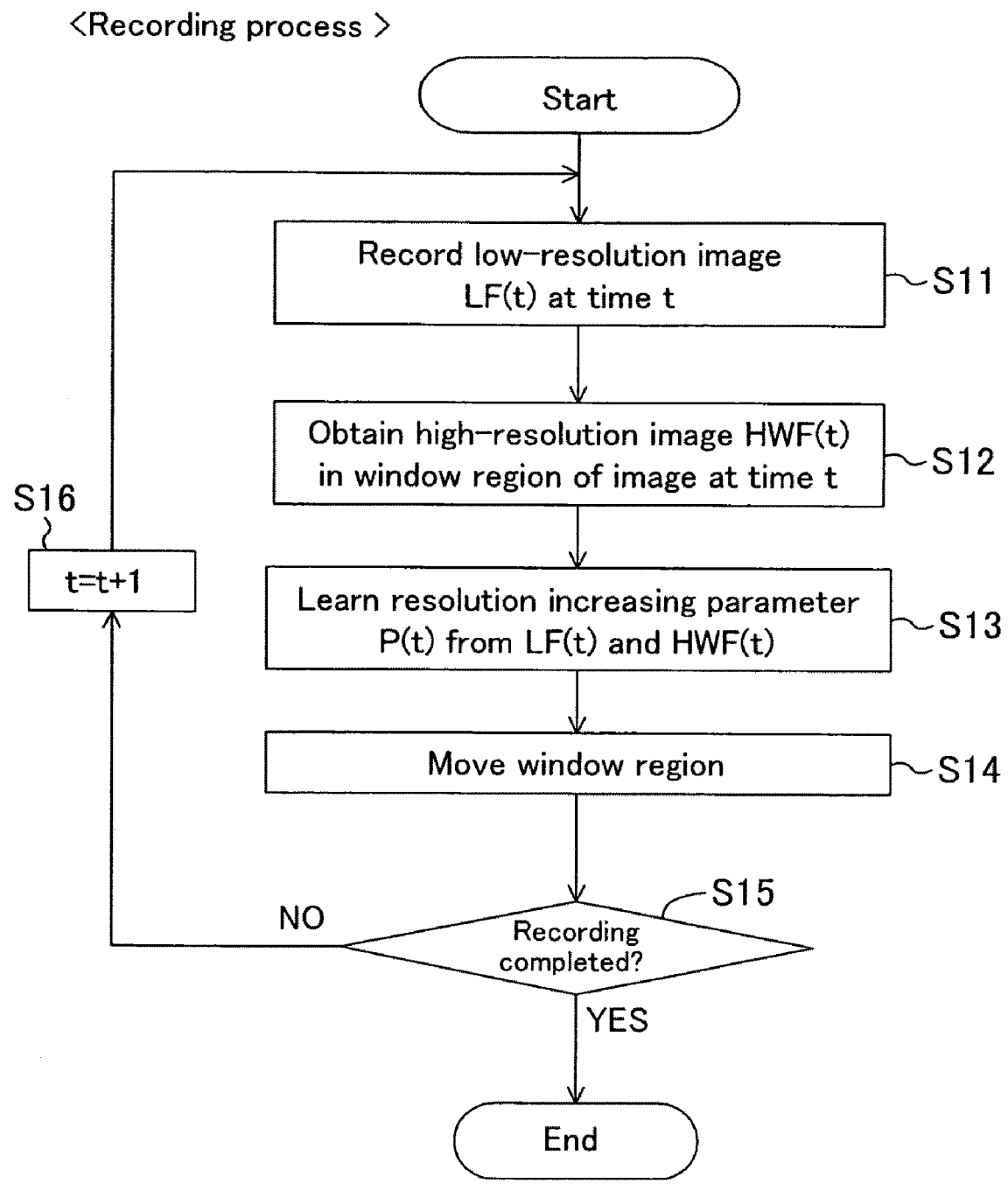
FIG. 1 is a flow chart showing a recording process in an image processing method according to a reference example.

201 Imaging section
202 Storage section
203 Read-out shift register
205 Skip scanning shift register
206 Progressive scanning shift register
207 Selector
208 Read shift register
211 Imaging pixel
221 Image-storing pixel
p2str Signal line
rd-p Read-out pulse supply line
trn Transfer pulse supply line
sig-out Signal output line
rd-s Read-out pulse supply line

BEST MODE FOR CARRYING OUT THE INVENTION

In a first embodiment, the present invention provides an imaging device, including: an imaging section including imaging pixels arranged in a two-dimensional arrangement for photoelectric conversion of incident light; a storage section including image-storing pixels arranged in a two-dimensional arrangement, each image-storing pixel corresponding to one of the imaging pixels; a transfer section for transferring a charge occurring in each of the imaging pixels to a corresponding one of the image-storing pixels as a signal; and an output section for reading out the signal from each of the image-storing pixels, wherein: the output section includes: a progressive scanning shift register for producing a read-out pulse to be supplied to a first region being a portion of the storage section; and a skip scanning shift register for producing a read-out pulse to be supplied to intermittently-selected rows in a second region including an entire region other than the first region, wherein the output section is configured so that for the first region, a read-out pulse produced by the progressive scanning shift register can be used to perform a progressive read-out operation of reading out signals from all rows of image-storing pixels, whereas for the second region, a read-out pulse produced by the skip scanning shift register can be used to perform a skip read-out operation of reading out signals from intermittently-selected rows of image-storing pixels; and the progressive scanning shift register produces the read-out pulse so that the first region moves every frame and the first region scans an entire region of the storage section over a plurality of frames.

In a second embodiment, the present invention provides an imaging device, including: an imaging section including imaging pixels arranged in a two-dimensional arrangement for photoelectric conversion of incident light; a storage section including image-storing pixels arranged in a two-dimensional arrangement, each image-storing pixel corresponding to one of the imaging pixels; a transfer section for transferring a charge occurring in each of the imaging pixels to a corresponding one of the image-storing pixels as a signal; and an output section for reading out the signal from each of the image-storing pixels, wherein: the output section includes: a progressive scanning shift register for producing a read-out pulse to be supplied to a first region being a portion of the storage section; and a skip scanning shift register for producing a read-out pulse to be supplied to intermittently-selected rows in a second region including an entire region other than the first region, wherein the output section is configured so that for the first region, a read-out pulse produced by the progressive scanning shift register can be used to perform a progressive read-out operation of reading out signals from all rows of image-storing pixels, whereas for the second region, a read-out pulse produced by the skip scanning shift register can be used to perform a skip read-out operation of reading out signals from intermittently-selected rows of image-storing pixels; and the skip scanning shift register produces the read-out pulse so that positions of the intermittently-selected rows move every frame.

In a third embodiment, the present invention provides the imaging device of the second embodiment, wherein the skip scanning shift register produces the read-out pulse so that positions of the intermittently-selected rows scan the entire second region over a plurality of frames.

First, an image processing method will be described, which is a reference example where an imaging device of the present invention is used.

REFERENCE EXAMPLE

Figure 2:
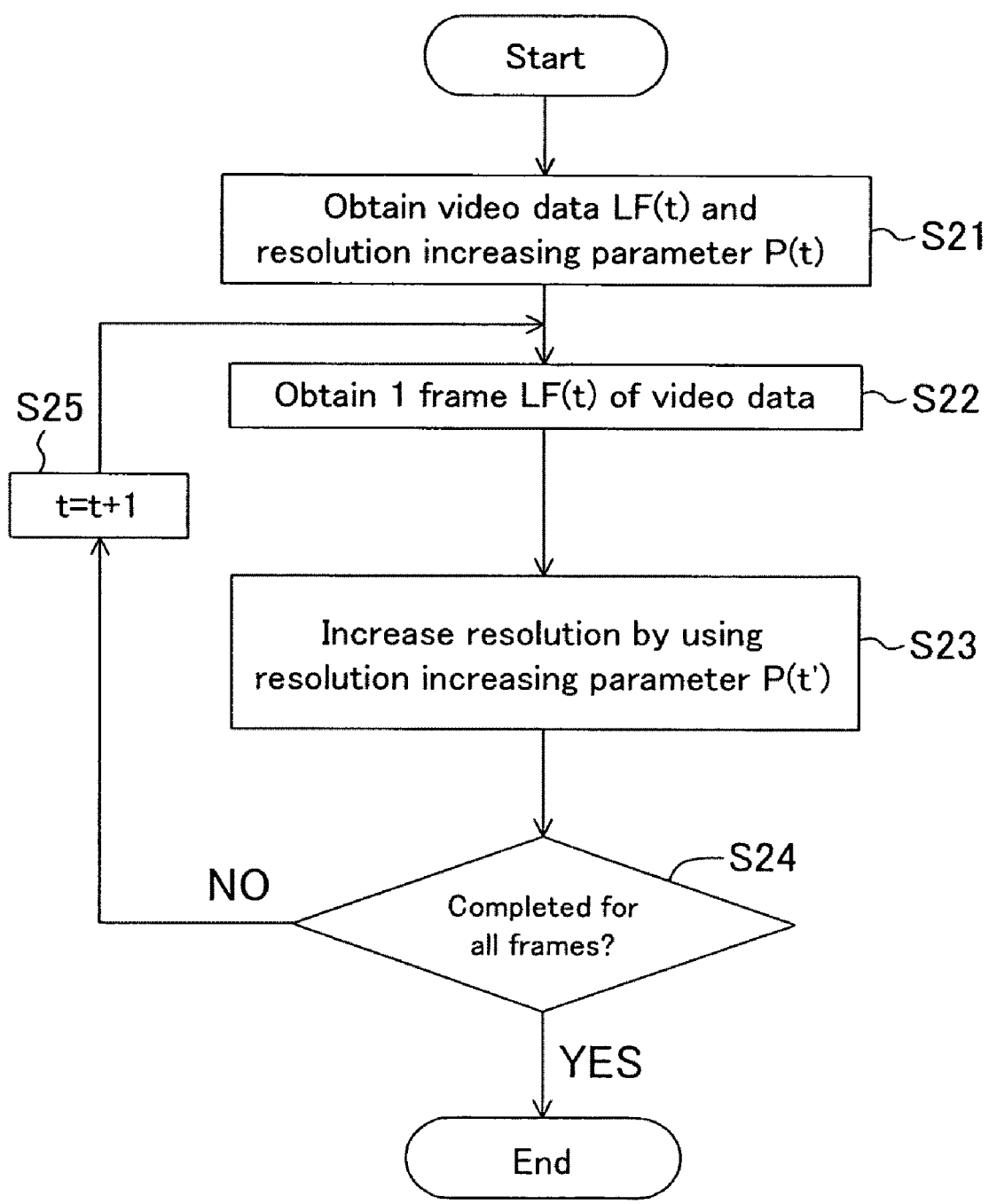
FIG. 2 is a flow chart showing a resolution increasing process in the image processing method according to the reference example.

FIGS. 1 and 2 are flow charts showing an image processing method according to a reference example of the present invention. FIG. 1 shows a recording process of recording a scene, and FIG. 2 shows a resolution increasing process of reproducing and displaying the recorded video data. The process of FIG. 1 and that of FIG. 2 correspond to the video recording process and the reproduction process of watching the recorded video on a display, respectively.

The recording process of FIG. 1 first obtains and stores a low-resolution image LF(t) at time t(S11). At the same time, the process obtains a high-resolution image HWF(t) in a window region being a portion of the image frame (S12). Since the high-resolution image HWF(t) is only used in a later process, it does not need to be stored as video data. Based on these images LF(t) and HWF(t) of different resolutions, the process learns and stores a resolution increasing parameter P(t) as a resolution conversion rule (S13). Then, the window region is moved to another position (S14). If the recording has not been completed, control proceeds to the next process at time t+1 (S16). If the recording has been completed, the process ends (S15).

In step S13, the process obtains the texture feature for each of the low-resolution image LF(t) and the high-resolution image HWF(t), and parameterize the correlation between the texture feature quantities. The parameter P(t) is herein referred to as the "resolution increasing parameter". Essentially, the parameter is a function or table as shown below for outputting a high-resolution texture TFH in response to an input low-resolution texture TFL.

$$TFH = \text{Function}(TFL, t) \quad \text{(Expression 1)}$$

The resolution increasing parameter is used as the resolution conversion rule.

In the resolution increasing process of FIG. 2, the process obtains low-resolution video data LF(t) recorded in the recording process, and the resolution increasing parameter P(t) learned in the recording process (S21). Then, the process obtains a frame of video data (S22), and performs the resolution increasing process for that frame by using the resolution increasing parameter (S23). If the process is completed for all the frames, the process ends (S24). Otherwise, the process proceeds to the next frame (S25).

In step S23, it is preferred that the resolution increasing process is performed by using not only the resolution increasing parameter learned in that frame but also those learned in at least one frame before or after the current frame. This is because the resolution increasing parameter for the current frame is learned only for a window region being a portion of the image, and may not therefore be sufficient for increasing the resolution of the entire image. For example, the process may use a resolution increasing parameter P(t') for a period of time that includes an amount of time T before and after time t of the current frame.

$$t - T \leq t' \leq t + T \quad \text{(Expression 2)}$$

Figure 3:
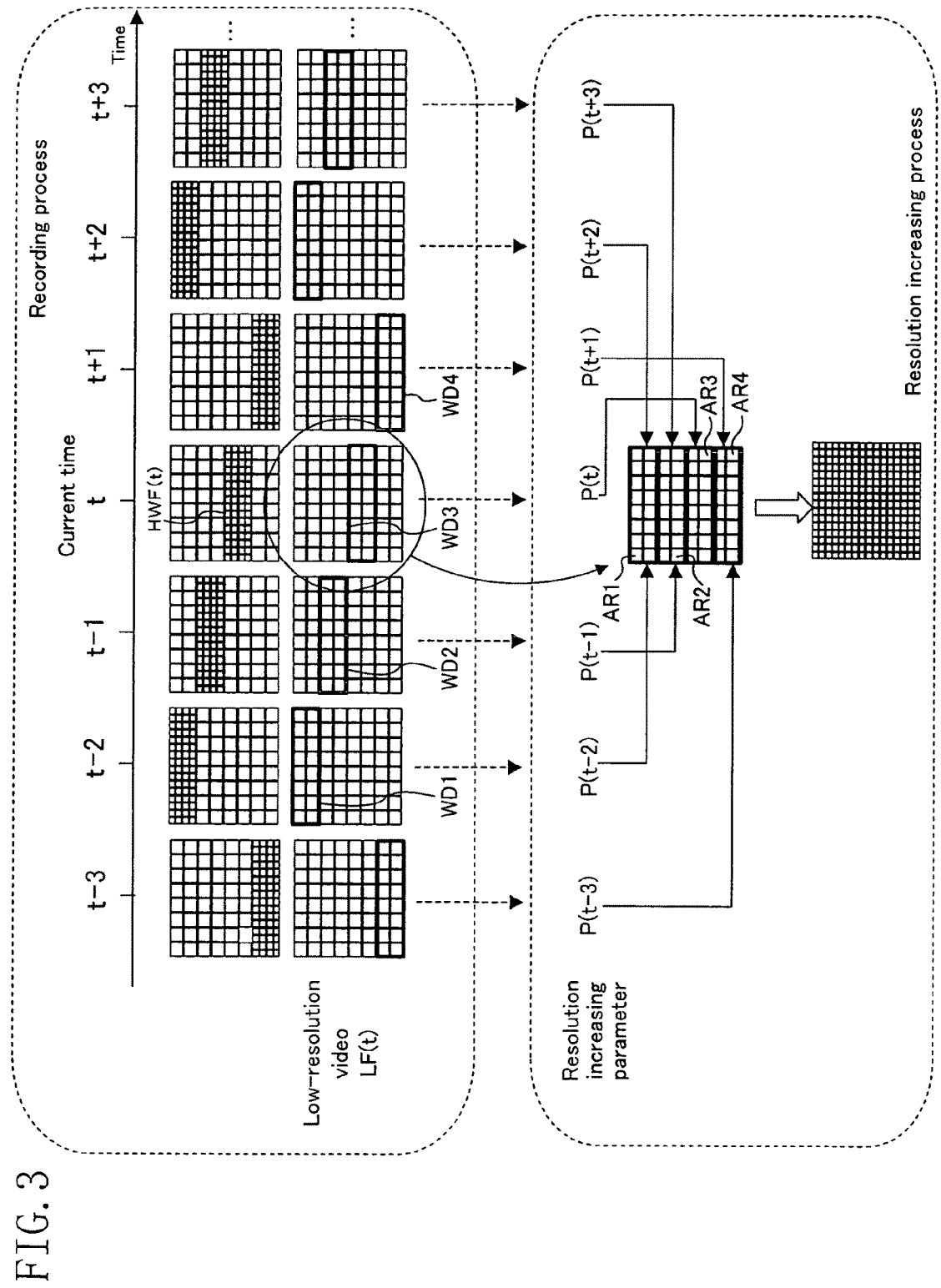
FIG. 3 is a conceptual diagram showing an example of a recording process and a resolution increasing process according to the reference example.

FIG. 3 conceptually shows an example of a recording process and a resolution increasing process according to this reference example. In FIG. 3, each frame of the low-resolution video data LF(t) is an 8×8-pixel image, and is divided into four window regions WD1 to WD4. The selected position of the window region (WD1 to WD4) changes every frame. In the illustrated example, the window region is gradually moved in the vertical scanning direction, i.e., from the top down to the bottom position and then back up to the top position. While the shape and the movement of the window region are simple in the illustrated example for ease of understanding, they are not limited to those of the illustrated example.

Within the window region (WD1 to WD4), the image is recorded with a higher resolution than outside the window region to obtain the high-resolution image HWF(t). It is assumed herein that the image is recorded in the window region with a pixel resolution 2×2 times as high as that outside the window region. The process may obtain video data where different pixel resolutions coexist in the same frame by recording the image with a high resolution within the window region and with a low resolution outside the window region as will be described later. Such video data is herein referred to as "multi-pixel-resolution video data".

With such multi-pixel-resolution video data, a low-resolution image is recorded outside the window region, but only a high-resolution image is recorded within the window region. Note however that it is not necessary to re-record a low-resolution image in the window region, which can be produced by performing an image filtering process such as subsampling or averaging on the high-resolution image. The modeling can be made more realistic by taking into consideration the optical system and the aperture shape of the imaging device. For example, the conversion can be done by applying a PSF (Point Spread Function) to the high-resolution image as a convolution calculation with a Gaussian function, and then integrating the obtained result over a range of the imaging device region having a two-dimensionally constant width.

At time t, four areas AR1 to AR4 (arranged vertically with one another) of the image correspond to the window region WD1 at time t−2, the window region WD2 at time t−1, the window region WD3 at time t, and the window region WD4 at t−3, respectively. Thus, at time t, the resolution increasing parameters for the areas AR1 to AR4 have already been learned at times t−2, t−1, t and t−3, respectively. With a video data frame rate of 1/30 (sec), the length of time from t−3 to t is only about 1/10 sec. Therefore, unless there is a very sudden change of scene, substantially the same feature information is obtained in each of these frames. Thus, it is effective to use the resolution increasing parameters from time t−3 to time t.

Moreover, any low-resolution image region at time t is always recorded with a high resolution at:

time t−1 or t+3;
time t−2 or t+2; or
time t−3 or t+1.

Therefore, where the process uses resolution increasing parameters from three preceding frames and those from three subsequent frames, the resolution increasing process is effective unless there is a very sudden change of scene within the time frame. This is equivalent to setting T=3 in (Expression 1) above.

Assume resolution increasing parameters P(t−3), P(t−2), . . . are given at corresponding points in time as shown in FIG. 3. In the resolution increasing process, the resolution of each area in each frame of the low-resolution video data can be increased by using the resolution increasing parameter of a frame that is close in time to the subject frame and at which the window region corresponds to the position of the subject area. For example, with an image LF(t) at time t, the resolution increasing parameters P(t−2), P(t−1), P(t) and P(t+1) can be used for the areas AR1, AR2, AR3 and AR4, respectively. Alternatively, the resolution increasing parameter P(t+2) may be used for the area AR1, and the resolution increasing parameter P(t+3) for the area AR2.

While FIG. 3 shows an example where the frame is divided into four window regions, the entire image may be divided into n window regions (where n is an integer of two or more), wherein the window region is moved so that the entire image is scanned across over n frames. Also with other methods, it is preferred that the window region is moved so that the entire image is scanned across over a plurality of frames.

Figure 4:
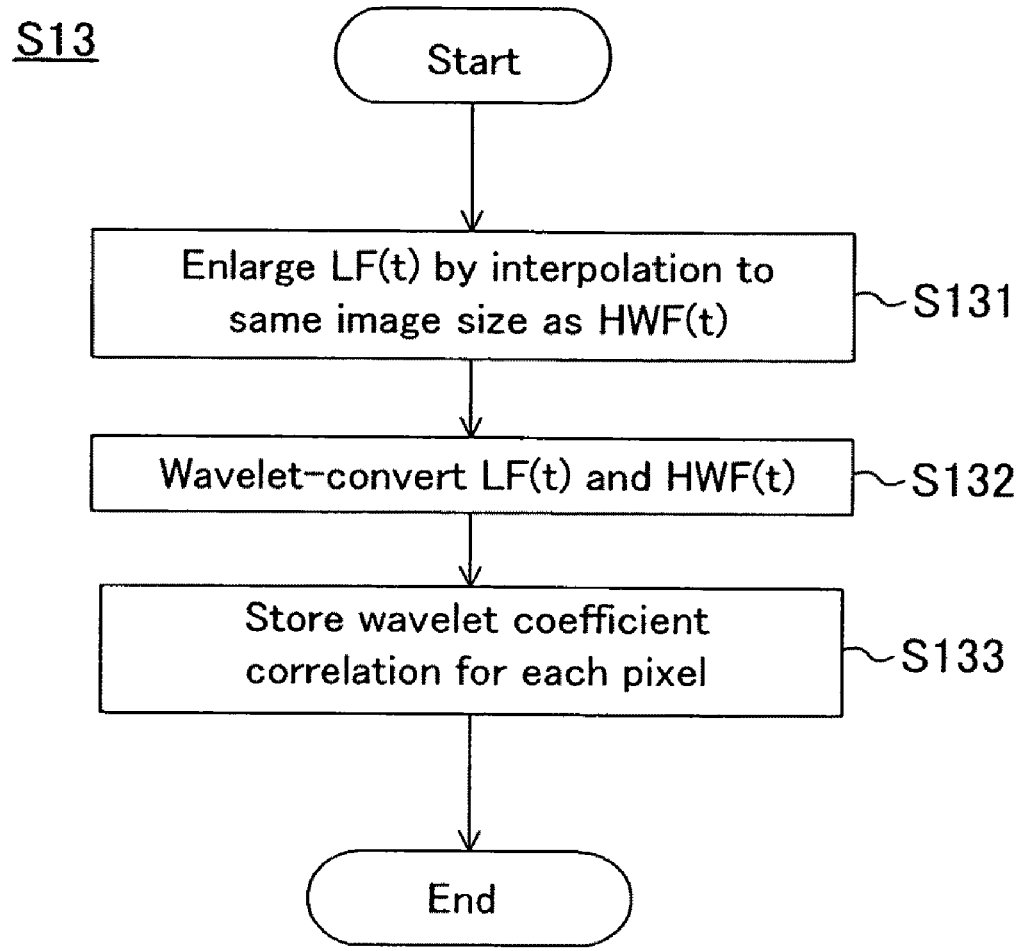
FIG. 4 is a flow chart showing an example of a process in step S13 of FIG. 1.

FIG. 4 is a flow chart showing an example of the process in step S13 of FIG. 1. This is an exemplary method for converting an image to a texture feature vector, wherein resolution increasing parameters are learned using the multi-resolution analysis based on the wavelet transform. First, the low-resolution image LF(t) is enlarged by interpolation so as to match the image size of the low-resolution image LF(t) with that of the high-resolution image HWF(t) (S131). Then, the two images LF(t) and HWF(t) are transformed by a wavelet transform using three-step scaling process to be described later (S132). Finally, the correlation between the wavelet coefficients of the two images LF(t) and HWF(t) is stored for each pixel position (S133). The correlation is the resolution increasing parameter P(t).

Figure 5:
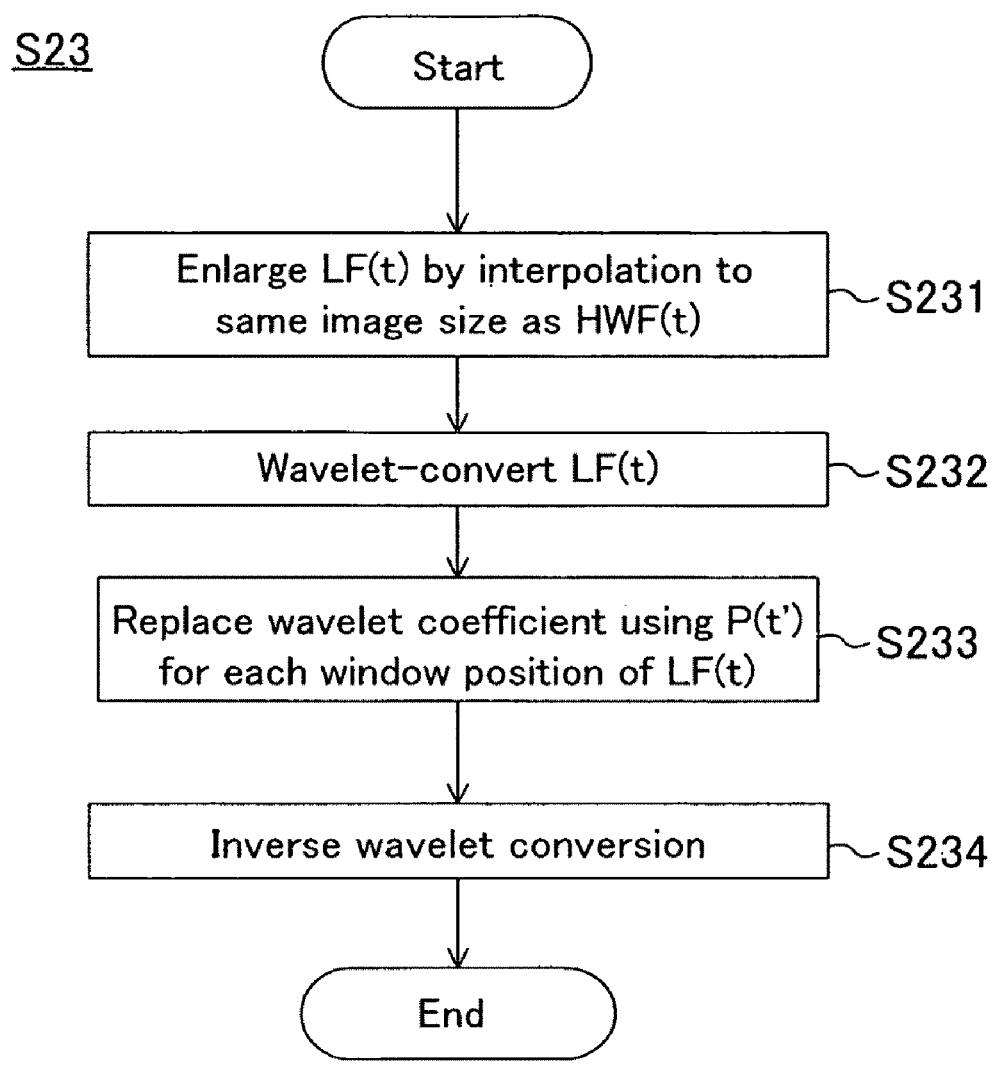
FIG. 5 is a flow chart showing an example of a process in step S23 of FIG. 2.

FIG. 5 is a flow chart showing an example of a process in step S23 of FIG. 2. Herein, a resolution increasing process is performed by using the resolution increasing parameter P(t') for a period of time. First, the low-resolution image LF(t) is enlarged by interpolation to match the image size thereof with that of the high-resolution image HWF(t) (S231). Then, the low-resolution image LF(t) is wavelet-transformed (S232), and the wavelet coefficient is replaced by using the resolution increasing parameter P(t') (S233). Then, an inverse wavelet transform is performed to covert the image to a high-resolution image (S234). In step S233, a resolution increasing parameter from a different frame time may be used for a portion of the entire image as described above with reference to FIG. 3. Alternatively, resolution increasing parameters over a period of time may be quantized into a single set, which can be used as the resolution increasing parameter.

Figure 6:
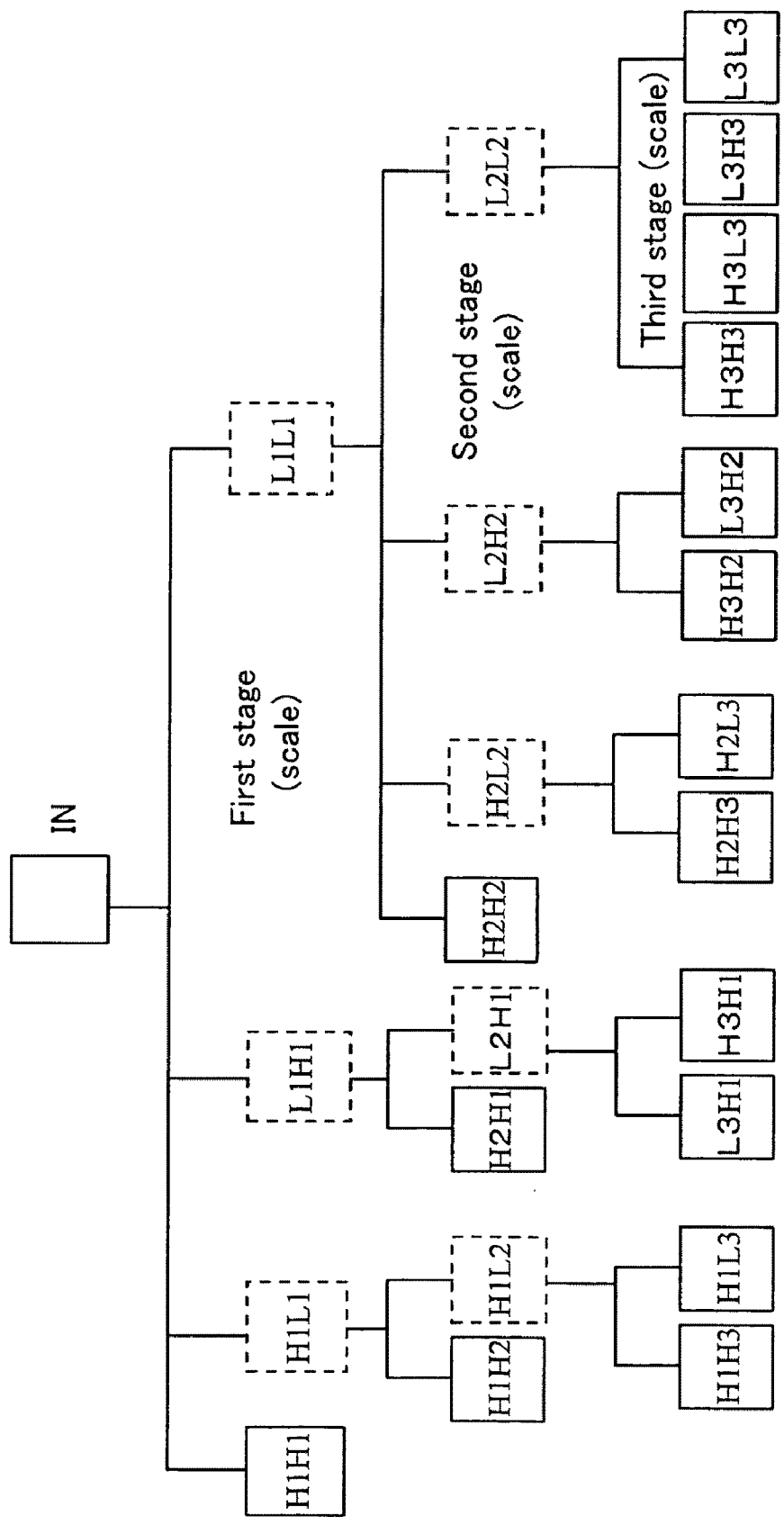
FIG. 6 shows an exemplary method for conversion to a texture feature quantity in step S132 of FIG. 4.

FIG. 6 shows an example of the wavelet transform in step S132 of FIG. 4. Referring to FIG. 6, in the first stage (scale), an input image IN is subjected to a wavelet transform in the X direction and in the Y direction to be decomposed into four component images H1H1, H1L1, L1H1 and L1L1 of the same size as the input image IN. In the second stage (scale), the components other than the component H1H1 which is the high-frequency component both in the X and Y directions, are further decomposed. Only the component L1L1 is again decomposed both in the X direction and in the Y direction, whereas the other components H1L1 and L1H1 are decomposed only in one direction, thus resulting in a total of eight components. In the third stage (scale), the components other than the components H1H2, H2H1 and H2H2 are decomposed similarly, wherein only the component L2L2 is decomposed both in the X and Y directions, whereas the other components are decomposed only in one direction, thus resulting in a total of 12 components. Those that are re-decomposed into two or four as the scale increases (those shown in dotted lines) can be produced by subsequent synthesis.

Figure 7:
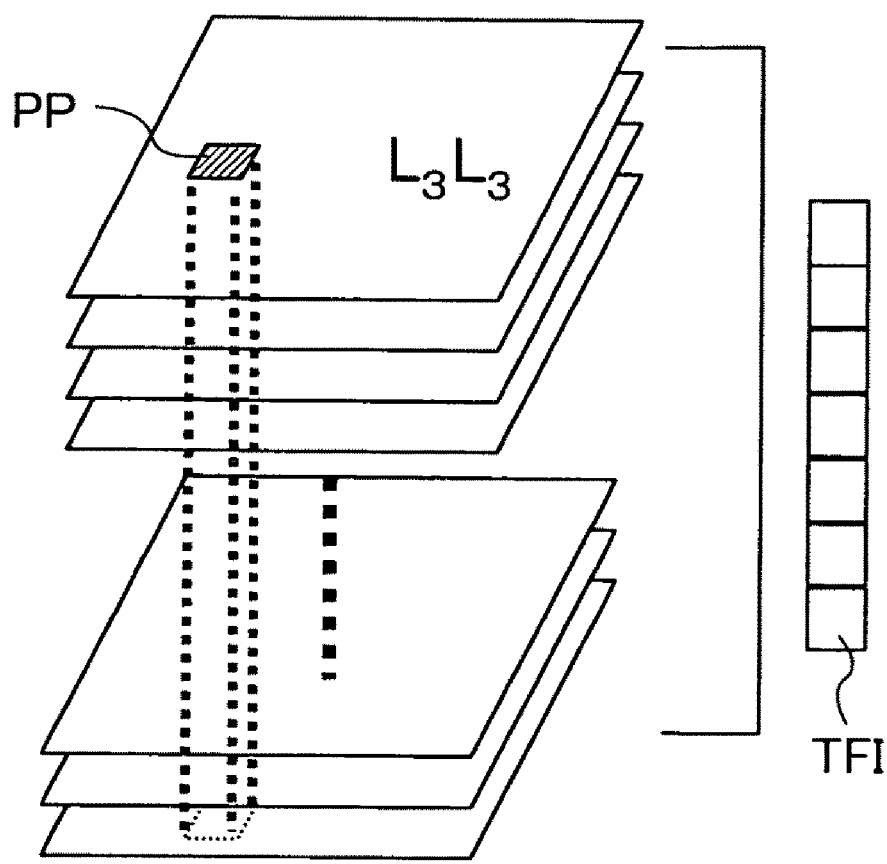
FIG. 7 shows a converted texture feature quantity.

Through the wavelet transform decomposition as shown in FIG. 6, each pixel of the input image IN is decomposed into 16 components as shown in FIG. 7. A vector obtained by combining together these 16 components is a texture feature TF1 at a pixel position PP.

As described above, the low-resolution image and the high-resolution image are each converted to a texture feature, and the correlation between the texture feature quantities is learned so as to produce an analysis code book and a reproduction code book. This process is described in detail in, for example, Yoshito Abe, Hisakazu Kikuchi, Shigenobu Sasaki, Hiromichi Watanabe and Yoshiaki Saitoh "Edge enhancement of images using multiresolution vector quantization", IEICE Transactions, Vol. J79A 1996/5 (pp. 1032-1040), and will not herein be described in detail. In such a case, the parameterization in step S13 corresponds to the production of an analysis code book and a reproduction code book. The resolution increasing parameter P(t) shown in (Expression 1) above is calculated from this.

In this reference example, a high-resolution image is obtained only in a window region being a portion of the image during the recording operation, and a resolution increasing parameter is produced by using an image feature such as a texture. Employment of such a process has the following advantages.

Firstly, instead of obtaining the resolution increasing parameter in a preliminary learning process from different video data, the resolution increasing parameter can be learned for the object itself of video data to be later subjected to the resolution increasing process, whereby it is possible to realize a high-precision image process. Moreover, since the resolution increasing parameter is a function of time, if it is learned for each frame, it is possible to instantaneously obtain an optimal resolution increasing parameter irrespective of the characteristics of an object appearing in the screen. Thus, in principle, there is no performance deterioration due to the difference in characteristics between the resolution increasing parameter obtained by a learning process and video data whose resolution is actually increased.

Secondly, what is used in the resolution increasing process is a feature such as the image texture, and has no direct correlation with the position in the screen, whereby it is not substantially influenced by the movement of the window region across the screen. Therefore, by appropriately moving the window to cover the entire image, it is possible to sufficiently use information from the entire image.

While the recording process shown in FIG. 1 and the resolution increasing process shown in FIG. 2 are typically performed sequentially in this order, the recording process and the resolution increasing process may be performed in parallel in time in a case where the camera recording process and the transmission/display process are performed at the same time as in a live broadcast.

In this reference example, only the low-resolution video data is recorded in the recording process, whose resolution is then increased in a resolution increasing process. Alternatively, for example, multi-pixel-resolution video data as shown in FIG. 3 may be recorded, whose resolution can later be increased in a resolution increasing process.

Embodiments of the present invention will now be described in detail with reference to the drawings.

FIRST EMBODIMENT

A first embodiment of the present invention is based on the reference example as described above, and is directed to a specific device configuration. In this embodiment, the recording process is performed by using a camcorder including a multi-pixel-resolution imaging section capable of recording multi-pixel-resolution video data as described above. The multi-pixel-resolution imaging section is realized by using an XY address type imaging device such as a CMOS-type imaging sensor.

Figure 8:
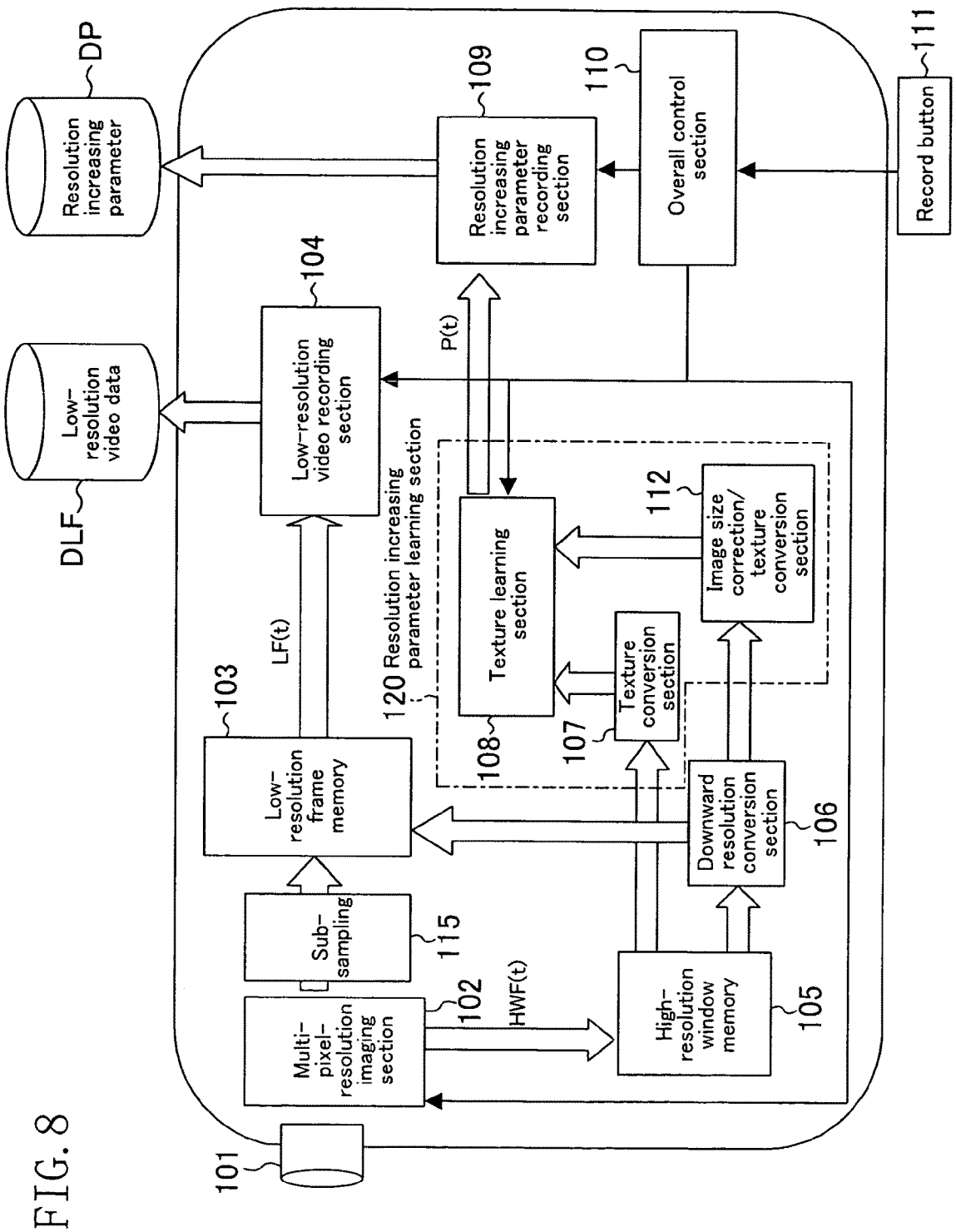
FIG. 8 shows an exemplary configuration of an image processing device according to a first embodiment of the present invention.

FIG. 8 is a block diagram showing an exemplary configuration of an image processing device using an imaging device of the present embodiment, wherein the present invention is applied to a camcorder. An image processing device 10 of FIG. 8 includes a lens 101, a multi-pixel-resolution imaging section 102, a low-resolution frame memory 103 for storing one frame LF(t) of low-resolution video data, a low-resolution video recording section 104 for recording low-resolution video data DLF, a high-resolution window memory 105 for storing the high-resolution image HWF(t) in the window region in one frame, a downward resolution conversion section 106 for performing an image process to convert the high-resolution image HWF(t) in the window region to a lower resolution, a resolution increasing parameter learning section 120 for learning the resolution increasing parameter P(t) by using the high-resolution image HWF(t) in the window region, a resolution increasing parameter recording section 109 for recording a resolution increasing parameter DP, an overall control section 110, and a record button 111. The resolution increasing parameter learning section 120 includes a texture conversion section 107 for converting the high-resolution image HWF(t) to a texture feature, an image size correction/texture conversion section 112 for correcting the pixel size of the low-resolution image and then converting it to a texture, and a texture learning section 108 for learning the texture correlation. Since the multi-pixel-resolution imaging section 102 herein reads out signals line by line, a sub-sampling circuit 115 for performing a horizontal pixel sub-sampling process is provided between the multi-pixel-resolution imaging section 102 and the low-resolution frame memory 103.

When the record button 111 is pressed, the overall control section 110 sends out a record command to the multi-pixel-resolution imaging section 102 and the low-resolution video recording section 104. When the record command is received, the multi-pixel-resolution imaging section 102 performs the recording process, wherein the low-resolution image LF(t) is stored in the low-resolution frame memory 103 for each frame. Then, the low-resolution video recording section 104 produces video data by chronologically combining together the low-resolution images LF(t) stored in the low-resolution frame memory 103, and further performs processes such as a data compressing process to obtain the low-resolution video data DLF, which is recorded on a storage medium or a network.

Simultaneously with the record command, the overall control section 110 sends out a learning signal to the texture learning section 108 and the resolution increasing parameter recording section 109. The high-resolution image HWF(t) in the window region obtained by the multi-pixel-resolution imaging section 102 is stored in the high-resolution window memory 105, and is input to the texture learning section 108 via the texture conversion section 107. The high-resolution image HWF(t) is input to the texture learning section 108 also via the image size correction/texture conversion section 112 after being subjected to the downward resolution conversion by the downward resolution conversion section 106. The texture learning section 108 learns the resolution increasing parameter P(t), being a resolution conversion rule, by associating together textures from images of the same point in time but of different resolutions. The resolution increasing parameter recording section 109 stores the parameter as the resolution increasing parameter DP, or sends out the parameter to a network.

The output of the downward resolution conversion section 106 is also supplied to the low-resolution frame memory 103. This is for filling the window region portion, which is missing in the low-resolution image LF(t), because the multi-pixel-resolution imaging section 102 obtains only the high-resolution image but does not read out the low-resolution image in the window region.

This operation is stopped when the record button 111 is released.

In the configuration of FIG. 8, sections from the multi-pixel-resolution imaging section 102 to the low-resolution video recording section 104 can be implemented by hardware, for example, and the texture learning section 108 and the resolution increasing parameter recording section 109 can be implemented primarily based on a CPU or GPU (Graphic Processing Unit).

Figure 9:
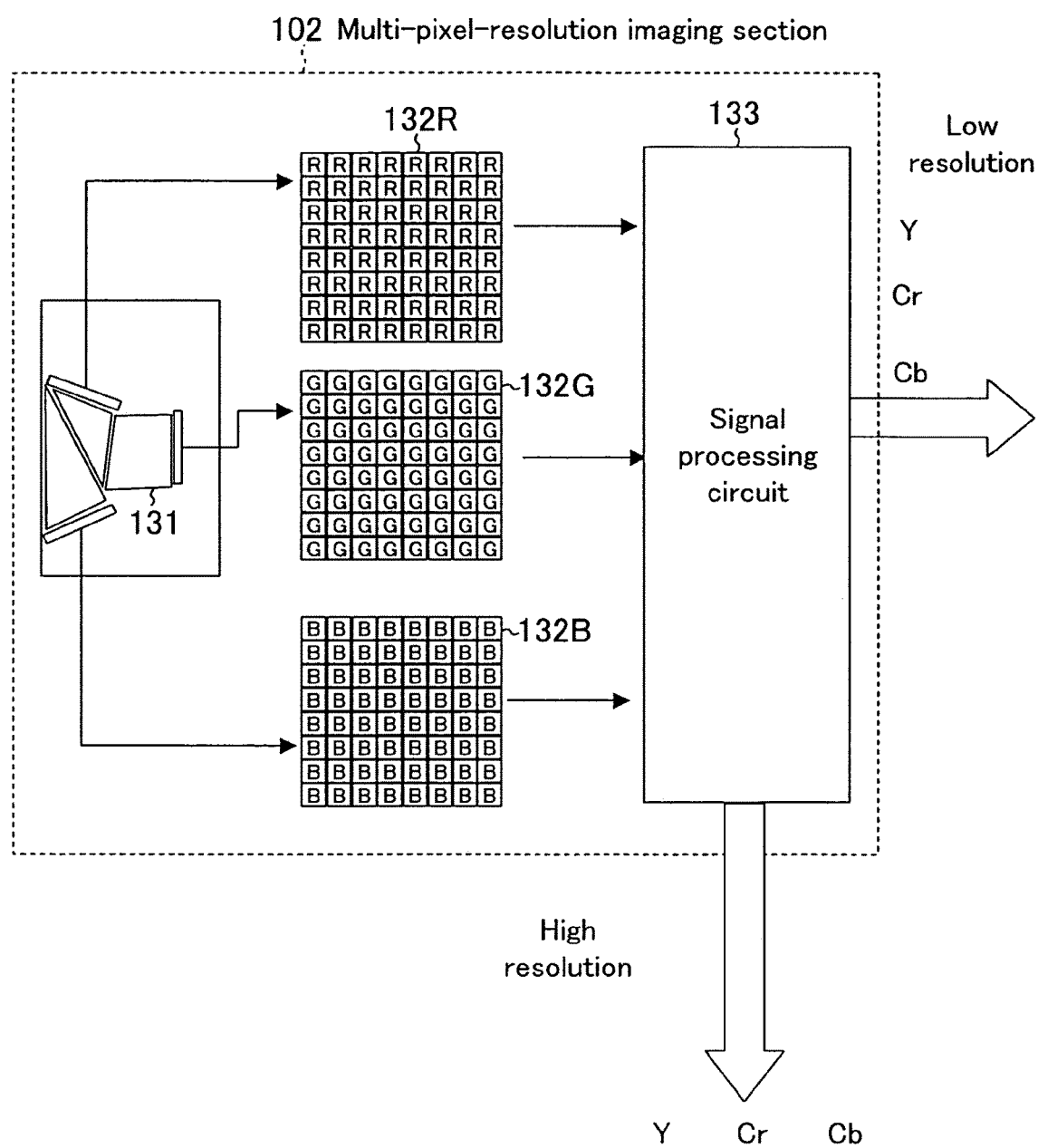
FIG. 9 is a conceptual diagram showing an exemplary configuration of a multi-pixel-resolution imaging section in FIG. 8.

FIG. 9 is a conceptual diagram showing an exemplary configuration of the multi-pixel-resolution imaging section 102. The configuration of FIG. 9 employs an ordinary three-chip optical system for color image recording used in a camcorder. With a three-chip system, a dichroic prism 131 splits light into three wavelength bands of red (R), green (G) and blue (B). These color bands are assigned multi-pixel-resolution imaging devices 132R, 132G and 132B, respectively. A signal processing circuit 133 processes the outputs from the multi-pixel-resolution imaging devices 132R, 132G and 132B to produce the luminance signal Y and the color difference signals Cr and Cb. In this process, a low-resolution signal obtained by a "skip read-out operation" to be described later and a high-resolution signal obtained by a "progressive read-out operation" also to be described later are output separately.

Video data is recorded in the YCrCb format. For texture learning, the luminance-color difference signals may be all used in the YCrCb format, or only the luminance Y signal may be used. However, where the resolution increasing factor is greater than 4×4, the resolution increasing process using only the luminance Y results in an insufficient image quality in view of the frequency response characteristics for the luminance component and those for the color component of the human visual system, whereby it is necessary to perform the resolution increasing process separately for the color difference CrCb. Therefore, for a factor of 4×4 or more, three signal components of red R, green G and blue B may be used for the texture learning. In the configuration of FIG. 9, red, green and blue are assigned the multi-pixel-resolution imaging devices 132R, 132G and 132B, respectively, and the video data recording format is set to the conventional luminance-color difference space, whereby the luminance signal Y and the two color difference signals Cr and Cb are used independently for the texture learning.

Figure 10:
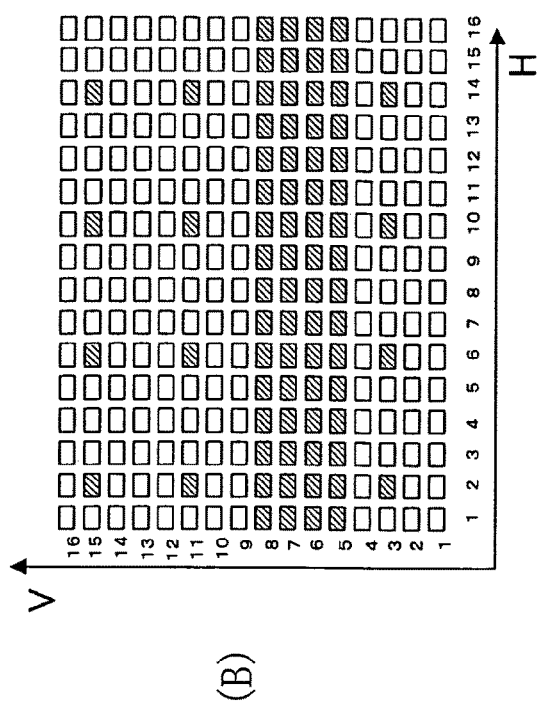
FIG. 10 shows an exemplary method for reading out pixels by a multi-pixel-resolution imaging device.
Figure 10:
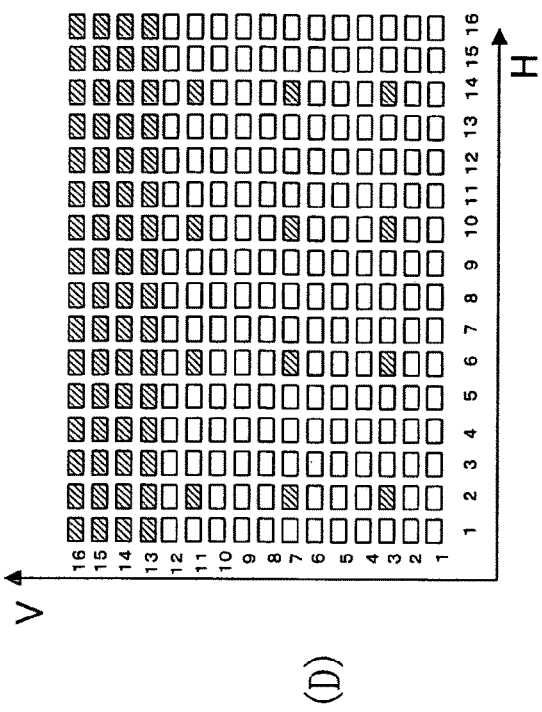
Figure 10:
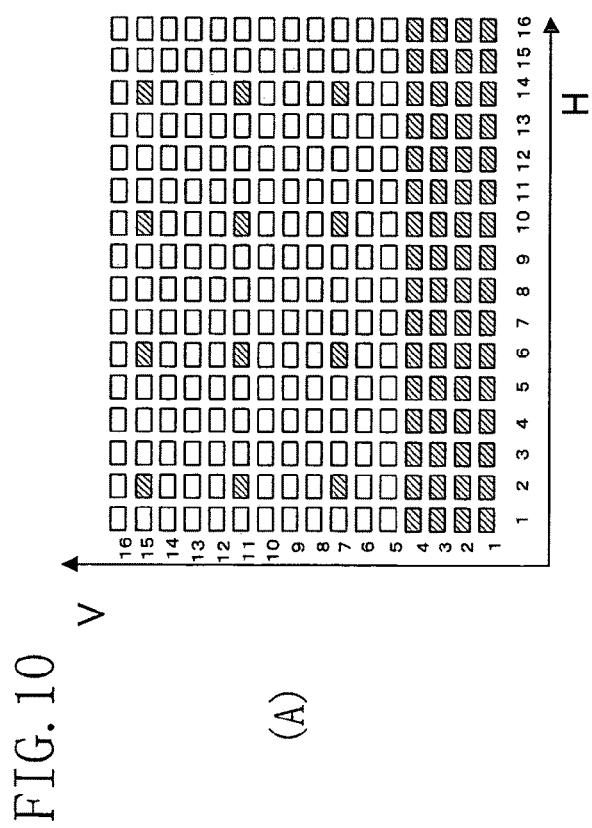
Figure 10:
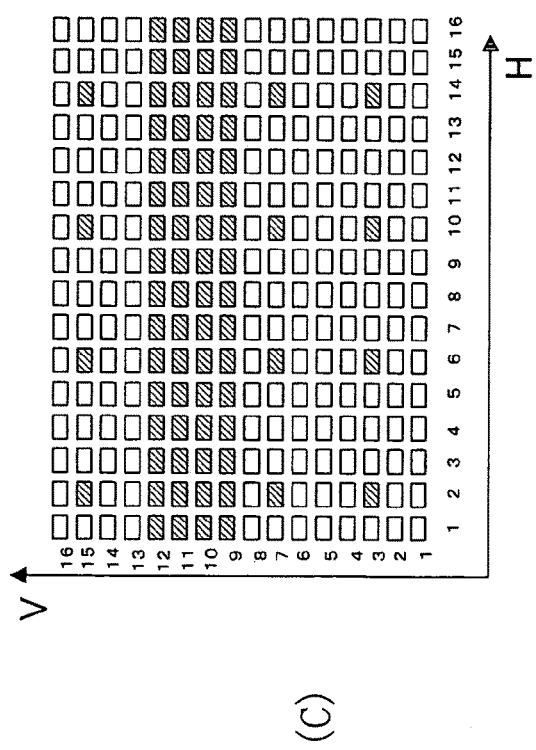

FIG. 10 shows an example of read-out pixel positions for a multi-pixel-resolution imaging device. In FIG. 10, hatched pixels are pixels to be read out. While a practical imaging device has about 2000×3000 pixels, the figure shows a 16×16-pixel two-dimensional sensor, i.e., 16 vertical lines and 16 horizontal lines. (A) to (D) show four frames that are contiguous in time.

As can be seen from FIG. 10, the 256 (=16×16) pixel region is divided into a region where all pixels are to be read out (corresponding to the window region in which the high-resolution image is obtained) and another region where a skip read-out operation is performed. The window region is successively moving from bottom to top, and the window region position repeats such a movement, in which each cycle is made up of the four frames from (A) to (D).

The method for obtaining a low-resolution image outside the window region may be any of various methods applicable. In FIG. 10, each read-out pixel position of the low-resolution image is at about the center of one of 16 virtual blocks into which the entire image is equally divided. This method produces a low-resolution image that has been sub-sampled to ¼ in the horizontal (H) direction and in the vertical (V) direction. In FIG. 10, the vertical line numbers to be read out in the skip read-out operation are (7, 11, 15) in (A), (3, 11, 15) in (B), (3, 7, 15) in (C) and (3, 7, 11) in (D).

As described above, the window region where all lines are read out is regularly moved in the vertical direction by four lines, whereas three fixed lines in the vertical directions are read out outside the window region. With this method, it is possible to perform the multi-pixel-resolution recording operation without reading out the same pixel twice. This read-out method is used in the present embodiment.

Figure 11:
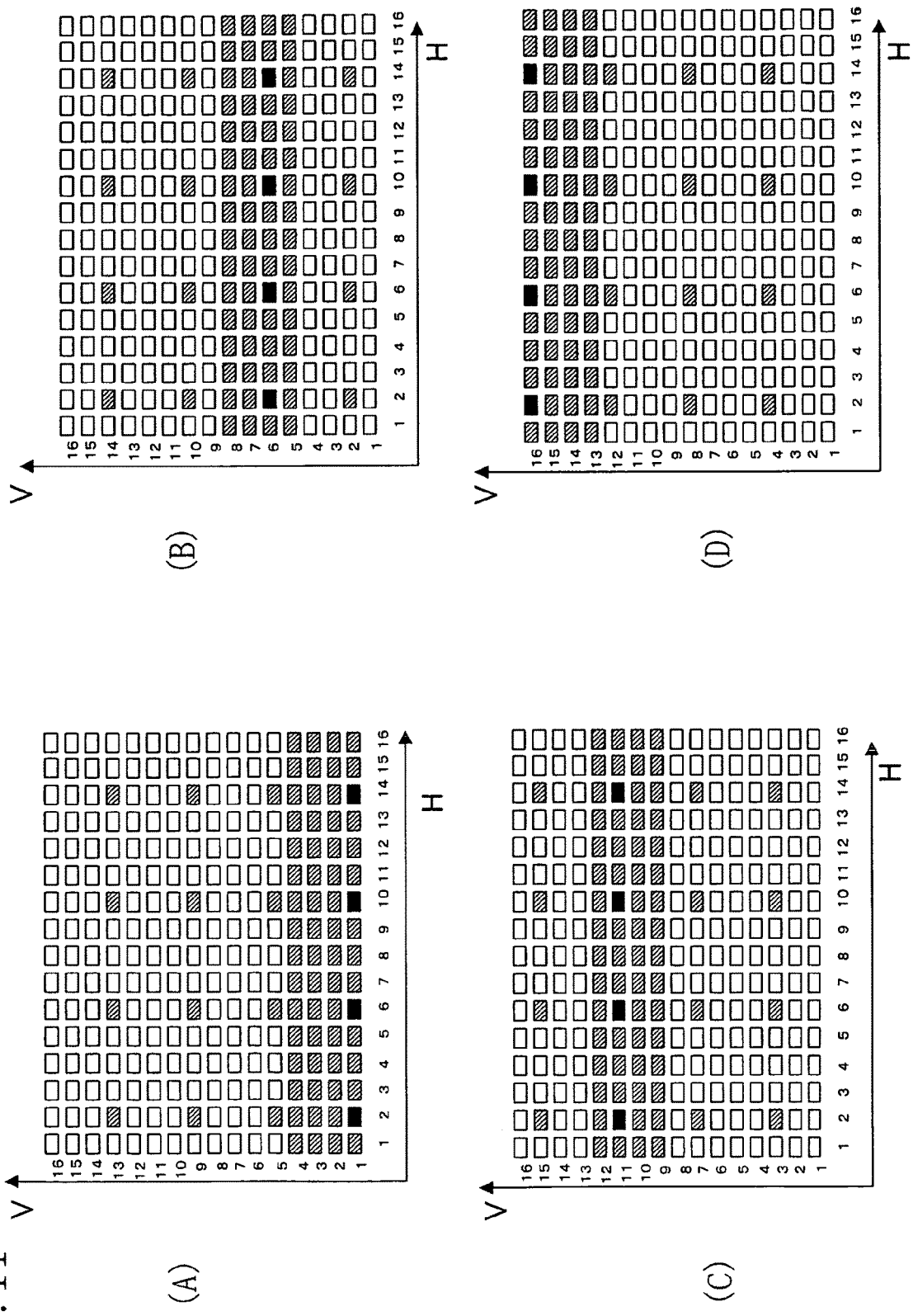
FIG. 11 shows an exemplary method for reading out pixels by a multi-pixel-resolution imaging device.

FIG. 11 shows another example of read-out pixel positions used by the multi-pixel-resolution imaging device. The example shown in FIG. 11 differs from that shown in FIG. 10 in the method for reading out the low-resolution image. With this method, a ¼-sub-sampled low-resolution image is read out at a different position for each frame, independently of the operation of reading out all lines in the window region. The purpose of this method is to equalize the sampling in the time and space domains, and allows for some pixels to be read out more than once. In FIG. 11, the vertical line numbers to be read out in the skip read-out operation are (1, 5, 9, 13) in (A), (2, 6, 10, 14) in (B), (3, 7, 11, 15) in (C) and (4, 8, 12, 16) in (D). Pixels shown in solid black are those that are read out more than once. With this method, the low-resolution video data can be obtained only with pixels read out in the skip read-out operation. Therefore, it is not necessary to supply the pixel values from the downward resolution conversion section 106 to the low-resolution frame memory 103 in order to fill the window region missing in the low-resolution image.

The equalization of the sampling in the time and space domains will now be described. In the reference example described above, while the resolution increasing process is realized by learning high-resolution window regions, an ordinary interpolation process is performed as a pre-process. With a video, it is effective for increasing the resolution in the time direction to perform the interpolation process in the time and space domains (i.e., with respect to space xy and time t). Where the time and space domains are a y-t space, the interpolation process is performed better if scanning lines are equally read out in advance in the time and space domains. Based on this theory, the read-out operation is performed at a different position in each frame in FIG. 11.

Figure 11A:
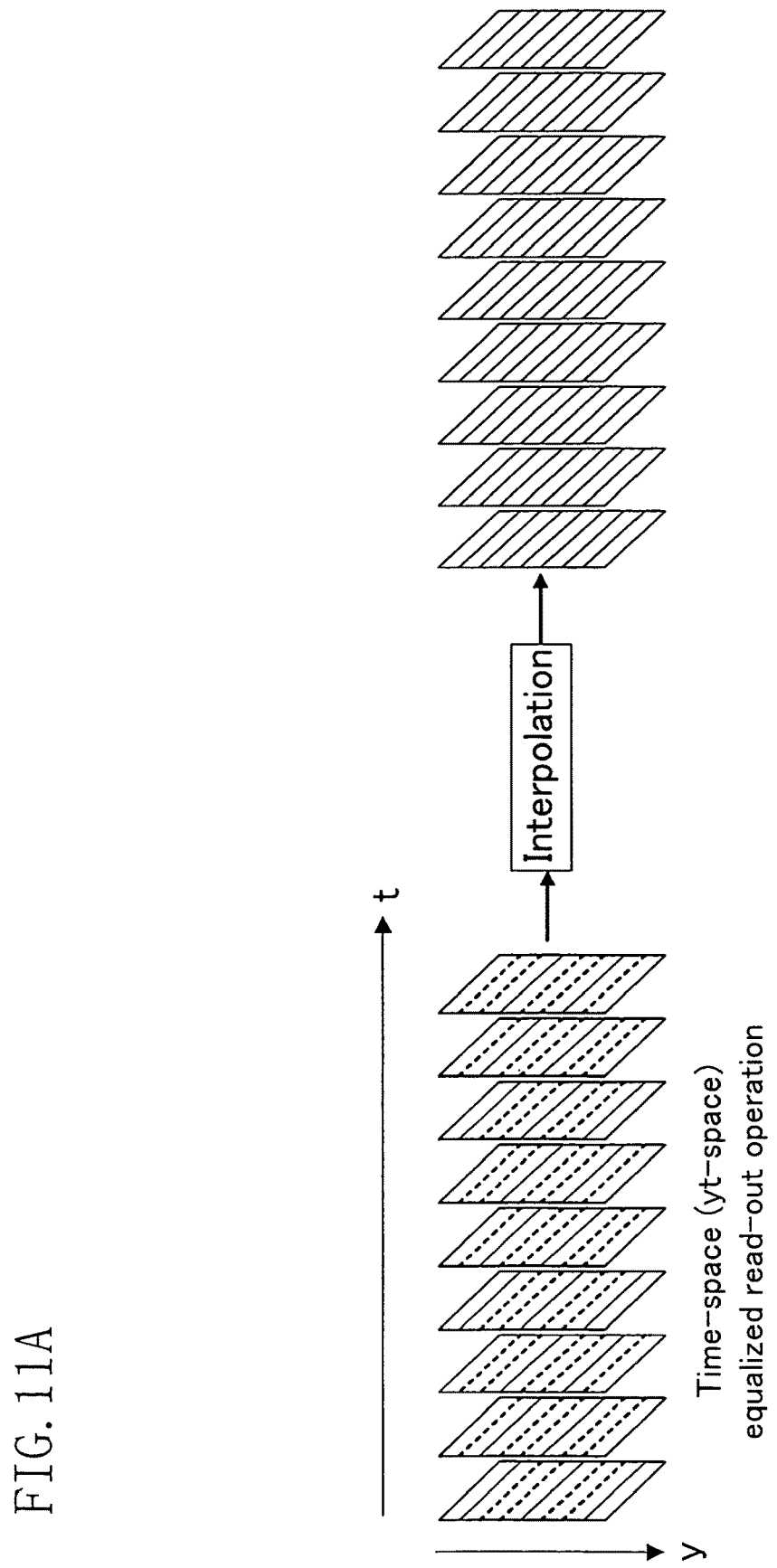
FIG. 11A is a conceptual diagram showing a time-space equalized read-out operation.
Figure 11B:
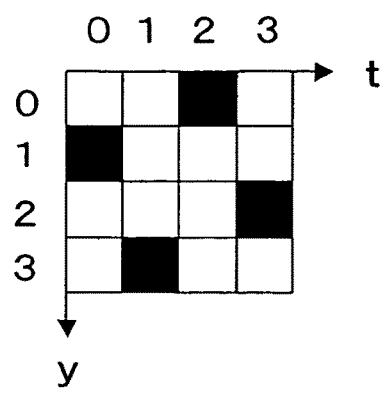
FIG. 11B shows a read pattern determined in view of the equality between the time and space domains.
Figure 11B:
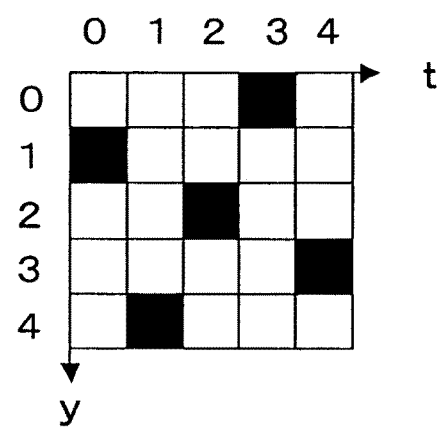

This can be expressed in the time and space domains as follows. As shown in FIG. 11A, a skip read-out operation is performed with a different phase in each frame so as to make a round in n frames. FIG. 11B shows read patterns made by actually taking into consideration the equality in the time and space domains where n is four and where n is five, respectively. The present invention is based on an imaging device such that the skip line pattern can be freely set within one cycle.

<Configuration of Imaging Device of Present Embodiment>

Figure 12:
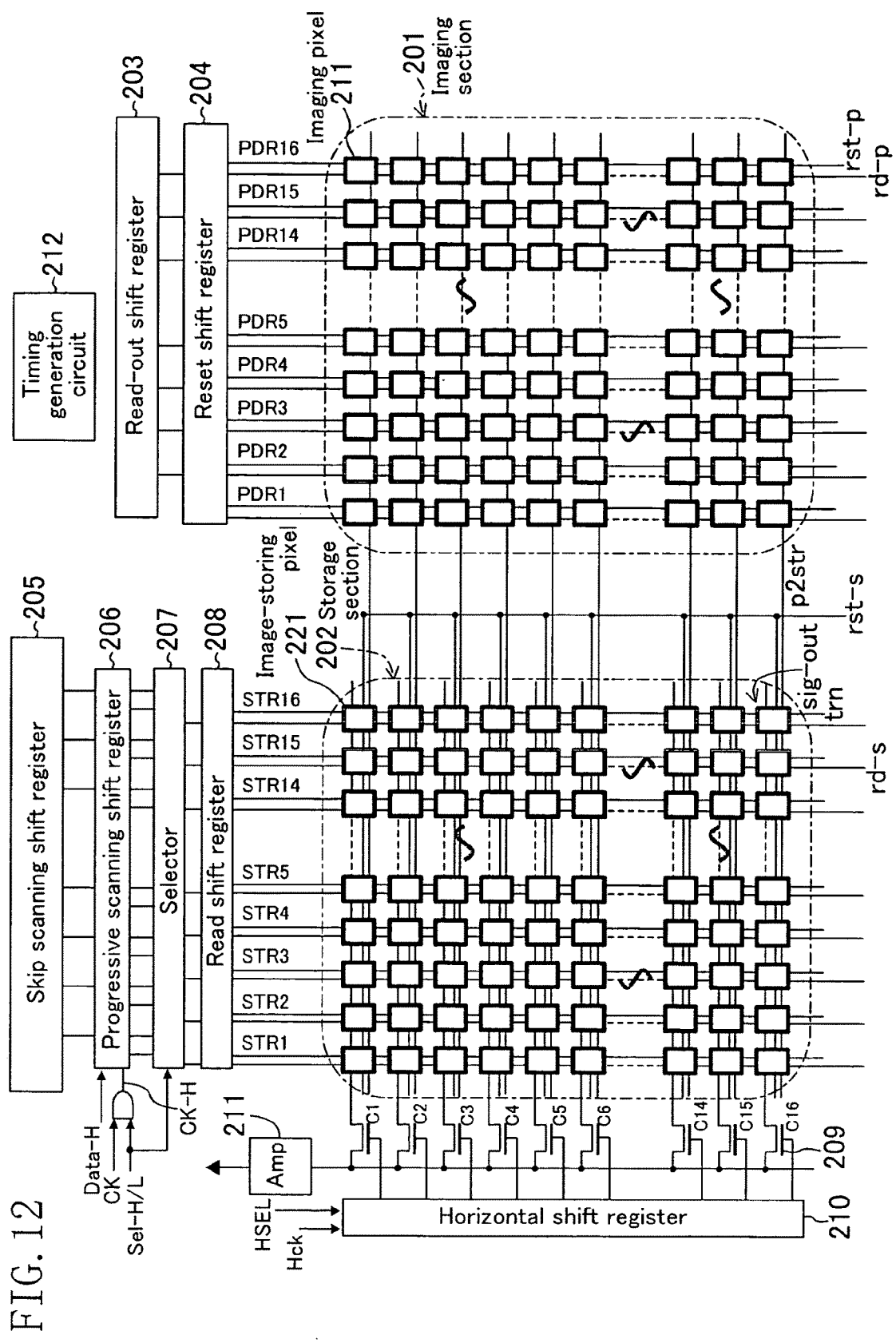
FIG. 12 shows an exemplary circuit configuration of an imaging device according to the first embodiment of the present invention.

FIG. 12 is a circuit block diagram showing an exemplary configuration of a multi-pixel-resolution imaging device as an imaging device of the present embodiment. FIG. 12 shows, as an example, a two-dimensional sensor with 16 vertical lines and 16 horizontal lines, capable of implementing a read-out method as shown in FIG. 11. In the following description, terms based on lines are used, and a process of reading out a portion of the screen with a high resolution is referred to as the "progressive read-out operation" whereas a process of reading out the screen with a low resolution is referred to as the "skip read-out operation".

Generally, the imaging device includes an imaging section 201 and a storage section 202. The imaging section 201 includes imaging pixels 211 capable of photoelectric conversion of the incident light, which are arranged in a two-dimensional arrangement (array). The storage section 202 includes image-storing pixels 221 including a light-blocking portion for blocking the incident light, which are arranged in a two-dimensional arrangement, each image-storing pixel 211 corresponding to one of the imaging pixels 211. The imaging section 201 and the storage section 202 are connected together via a signal line p2str for transferring signal charges from the imaging section 201 to the storage section 202.

Around the imaging section 201, the imaging device includes a read-out shift register 203 for successively shifting the read-out pulse line by line, and a reset shift register 204 for successively shifting the reset pulse line by line. The read-out pulse and the reset pulse are sent to each imaging pixel 211 of the imaging section 201 via a read-out pulse supply line rd-p and a reset pulse supply line rst-p, respectively. The imaging pixel 211 receiving the read-out pulse outputs the signal charge, and the imaging pixel 211 receiving the reset pulse resets the signal charge.

Around the storage section 202, the imaging device includes a skip scanning shift register 205 for outputting a read-out pulse used in the "skip read-out operation", a progressive scanning shift register 206 for outputting a read-out pulse used in the "progressive read-out operation", a selector 207 for selectively supplying the output from the skip scanning shift register 205 or the output from the progressive scanning shift register 206 to the storage section 202, and a read shift register 208 used when transferring the signal charge from the imaging section 201 to the storage section 202. The read-out pulse output from the selector 207 is supplied to each image-storing pixel 221 of the storage section 202 via a read-out pulse supply line rd-s. The transfer pulse output from the read shift register 208 is supplied to each image-storing pixel 221 of the storage section 202 via a transfer pulse supply line trn.

The progressive scanning shift register 206 generates a pulse for partially reading out the high-resolution image, obtained by reading out all lines, in each frame (e.g., outputting a ¼ screen in each frame to form one full screen over four frames). In other words, the progressive scanning shift register 206 produces a read-out pulse to be supplied to a first region being a portion of the storage section 202. The progressive scanning shift register 206 produces the read-out pulse so that the first region moves every frame and so that the first region scans the entire region of the storage section 202 over a plurality of frames.

The skip scanning shift register 205 generates a pulse for obtaining in each frame one screen of the low-resolution image obtained by the skip read-out operation. In other words, the skip scanning shift register 205 produces a read-out pulse to be supplied to intermittently-selected rows in a second region including the entire region other than the first region. The skip scanning shift register 205 produces the read-out pulse so that the positions of the intermittently-selected rows move every frame. The skip scanning shift register 205 produces the read-out pulse so that so that the positions of the intermittently-selected rows scan the entire second region. The skip scanning shift register 205 will later be described in detail with reference to FIG. 15.

The imaging device also includes a group of select transistors 209, a horizontal shift register 210 and an output amplifier 211. The signal charges stored in the image-storing pixels 221 of the storage section 202 are output to the outside via signal output lines sig-out and through the group of select transistors 209 and the output amplifier 211 based on the order in which they are selected by the horizontal shift register 210.

A timing generation circuit 212 supplies pulses to the read-out shift register 203, the reset shift register 204, the skip scanning shift register 205, the progressive scanning shift register 206, the selector 207, the read shift register 208, the horizontal shift register 210 and a reset pulse supply line rst-s. Note however that the timing generation circuit 212 may be separately provided on a different chip from the imaging device.

The signal line p2str, the read-out shift register 203, the read-out pulse supply line rd-p, the read shift register 208 and the transfer pulse supply line trn together form a transfer section. The signal output line sig-out, the skip scanning shift register 205, the progressive scanning shift register 206, the selector 207 and the read-out pulse supply line rd-s together form an output section.

Figure 13:
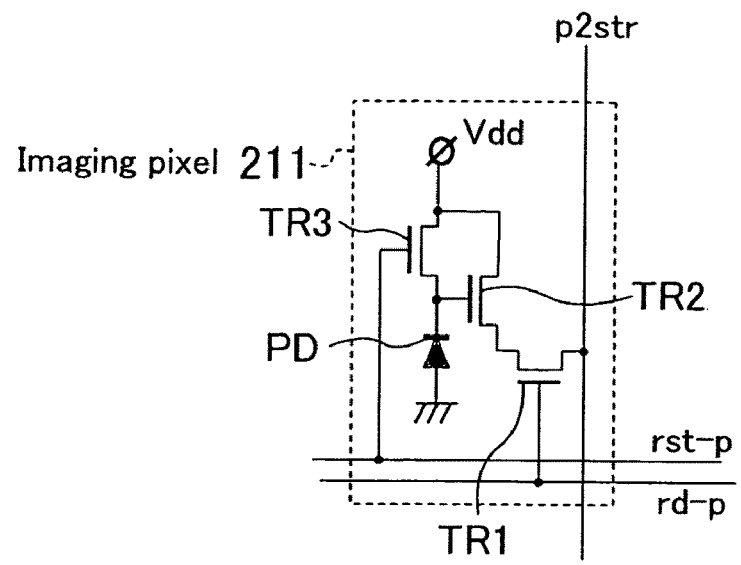
FIG. 13 shows an exemplary circuit configuration of an imaging pixel in the imaging device of FIG. 12.

FIG. 13 shows an exemplary configuration of the imaging pixel 211. The configuration of FIG. 13 is an orthodox 3-transistor configuration. Specifically, the imaging pixel 211 includes a photodiode PD for generating a signal charge in response to light, a read-out transistor TR1 whose gate is connected to the read-out pulse supply line rd-p for outputting the signal charge to the signal line p2str, a source follower transistor TR2, and a reset transistor TR3 whose gate is connected to the reset pulse supply line rst-p for resetting the stored signal charge.

Figure 14:
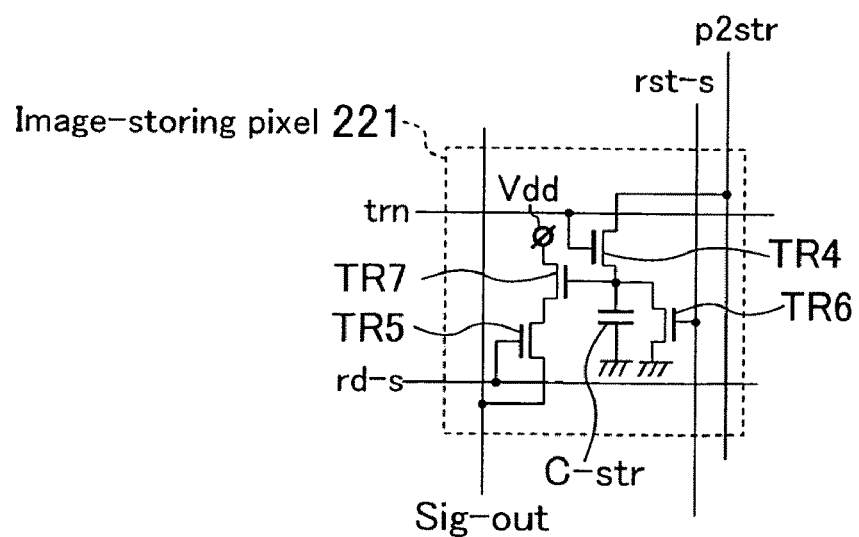
FIG. 14 shows an exemplary circuit configuration of an image-storing pixel in the imaging device of FIG. 12.

FIG. 14 shows an exemplary configuration of the image-storing pixel 221. The configuration of FIG. 14 includes four transistors and one capacitor. Specifically, the image-storing pixel 221 includes a transistor TR4 whose gate is connected to the transfer pulse supply line trn, a storage capacitor C-str for storing a signal charge transferred from the imaging pixel 211 through the signal line p2str and the transistor TR4, a transistor TR5 whose gate is connected to the read-out pulse supply line rd-s for reading out the signal charge stored in the storage capacitor C-str to the signal output line sig-out, a transistor TR6 whose gate is connected to the reset pulse supply line rst-s for resetting the storage capacitor C-str to the GND level, and a source follower transistor TR7.

Figure 15:
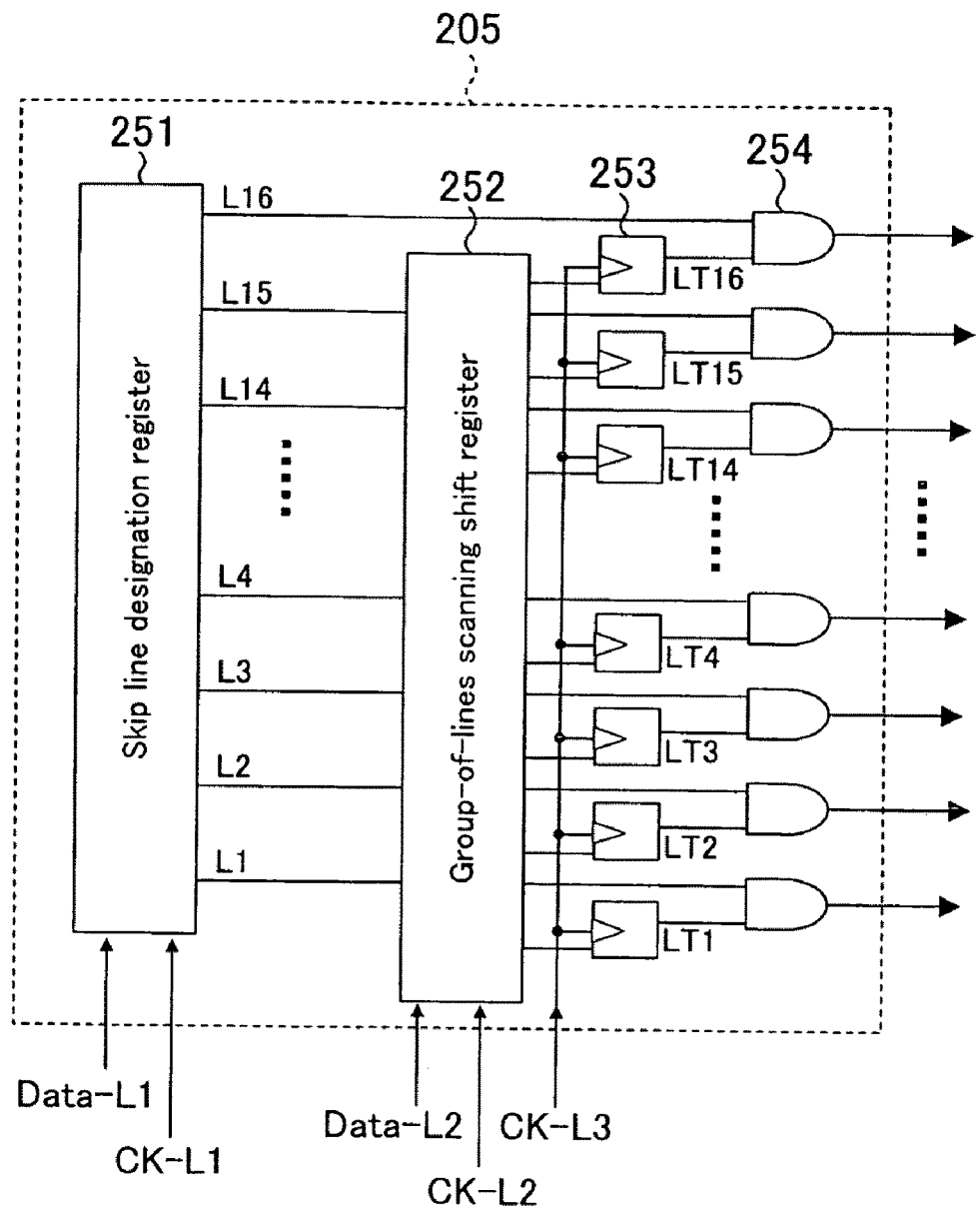
FIG. 15 shows an exemplary circuit configuration of a skip scanning shift register in the imaging device of FIG. 12.

FIG. 15 shows an exemplary configuration of the skip scanning shift register 205. In FIG. 15, the skip scanning shift register 205 includes a skip line designation register 251, a group-of-lines scanning shift register 252, a D latch 253, etc. The details of the operation thereof will be described later.

Figure 16:
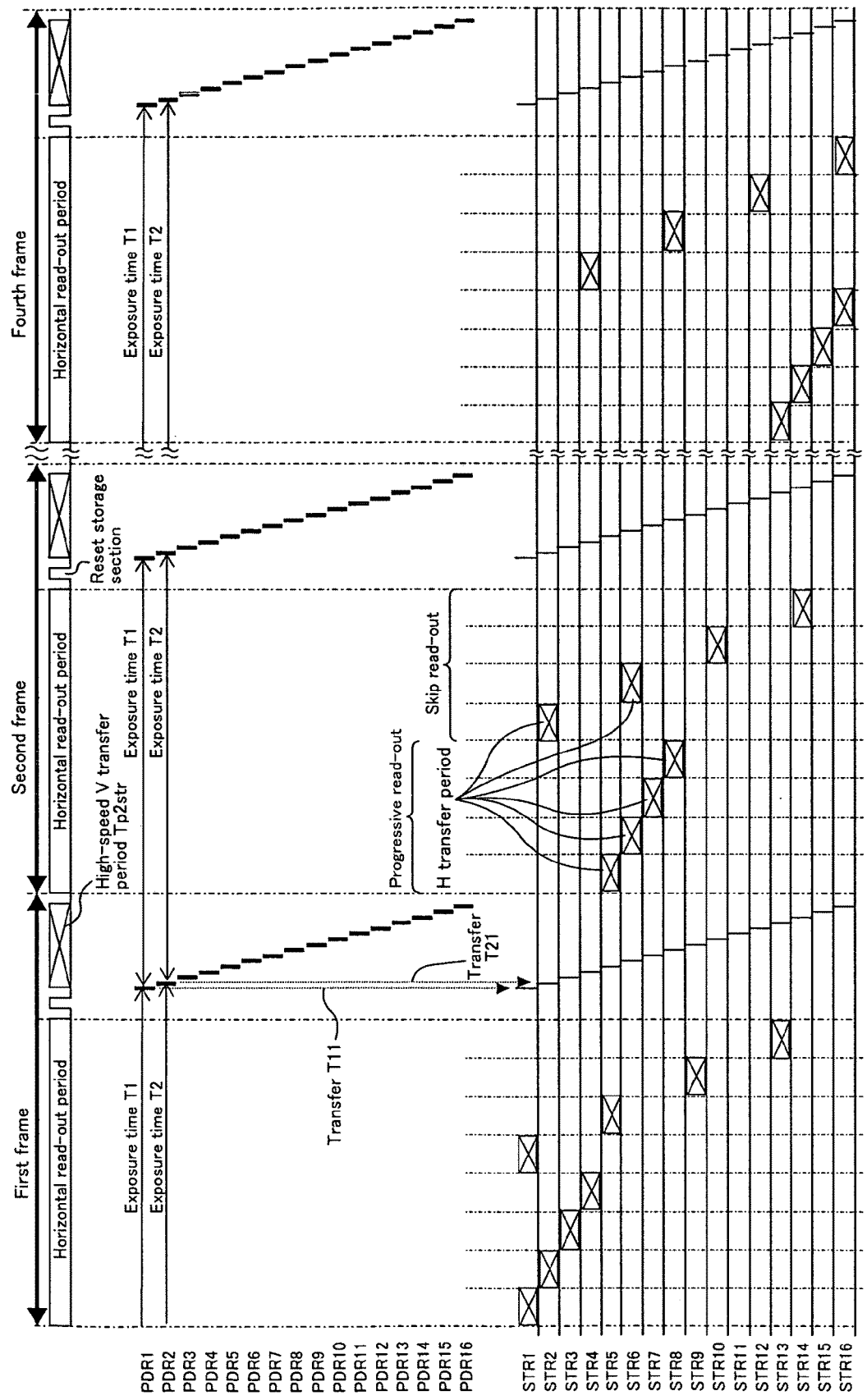
FIG. 16 is an operation sequence diagram illustrating the outline of a series of operations, i.e., the imaging operation, the transfer operation and the read-out operation, by the imaging device shown in FIGS. 12 to 15.

FIG. 16 is an operation sequence diagram illustrating the outline of a series of operations, i.e., the image-recording operation, the transfer operation and the read-out operation, by the multi-pixel-resolution imaging device shown in FIGS. 12 to 15. FIG. 16 shows the general operation over a series of four frames (note however that the third frame is omitted due to limitations of space).

In the first frame, after the exposure time T1 for a line PDR1 in the imaging section 201 is completed, the signal charges on the line PDR1 are transferred at once to pixels along the corresponding line STR1 in the storage section 202 during the following transfer period T11. The transferred signal charges are stored in the storage capacitors C-str in the image-storing pixel 221 of corresponding horizontal positions. Then, after the exposure time T2 for a line PDR2 is completed, the signal charges on the line PDR2 are transferred at once to pixels along the corresponding line STR2 in the storage section 202 during the following transfer period T21. The transferred signal charges are stored in the storage capacitors C-str in the image-storing pixel 221 of corresponding horizontal positions.

The read-out/transfer operation is performed successively for 16 lines PDR1 to PDR16 during the high-speed V transfer period Tp2str. Specifically, the signal charges obtained by photoelectric conversion by the photodiodes PD in the imaging pixels 211 during an exposure time are transferred in the high-speed V transfer period Tp2str from the imaging section 201 to the storage section 202, and are stored in the storage section 202.

The signal charges stored in the storage section 202 in the first frame are read out to the outside during the horizontal read-out period in the next, second frame. In the second frame, the progressive read-out operation is performed for the four lines STR5 to STR8, and the skip read-out operation is performed for the four lines STR2, STR6, STR10 and STR14. The other lines are not read out. As the reset pulse is applied to the reset pulse supply line rst-s in the storage section resetting period, the storage capacitors C-str in all the image-storing pixels 221 of the storage section 202 are all reset to the GND level.

A similar scanning operation is performed in the subsequent frames. In the fourth frame, the progressive read-out operation is performed for the four lines STR13 to STR16, and the skip read-out operation is performed for the four lines STR4, STR8, STR12 and STR16. The other lines are not read out. As the reset pulse is applied to the reset pulse supply line rst-s in the storage section resetting period, the storage capacitors C-str in all the image-storing pixels 221 of the storage section 202 are all reset to the GND level.

FIG. 16 shows an example where in each frame, a series of four lines are read out in a progressive read-out operation and four non-contiguous lines selected every four lines are read out in a skip read-out operation. However, the number of lines to be read out is not limited to this, and the number of lines to be read out in the progressive read-out operation does not need to be the same as the number of lines to be read out in the skip read-out operation. For example, the progressive read-out operation may be performed for a series of n lines, and the skip read-out operation may be performed every m lines. Moreover, while the line STR6 is read out more than once in the second frame for example for the sake of simplicity, a line does not need to be read out more than once.

Figure 17:
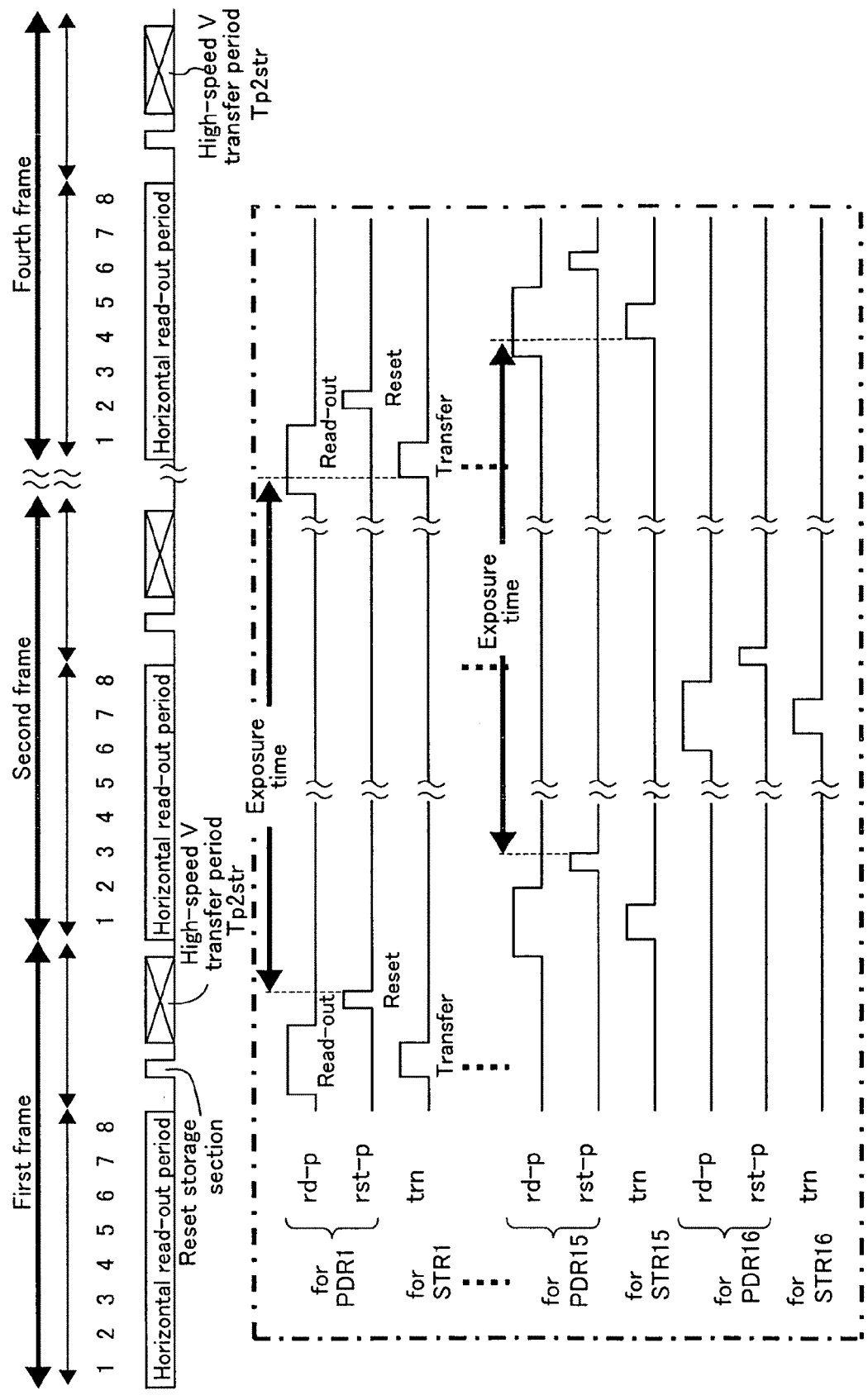
FIG. 17 is a timing diagram showing the operation during the high-speed V transfer period of FIG. 16.

FIG. 17 is a timing diagram showing an operation in the high-speed V transfer period Tp2str. Referring to FIG. 17, after the exposure time T1 is completed for the line PDR1 in the first frame, a read-out pulse is supplied to the read-out pulse supply line rd-p. The read-out pulse is applied to the gate of the transistor TR1 in the imaging pixel 211 of FIG. 13, and a signal potential corresponding to the signal charge of the photodiode PD is output to the signal line p2str via the source follower transistor TR2. In the line STR1, when a transfer pulse is supplied to the transfer pulse supply line trn, the transfer pulse is applied to the gate of the transistor TR4 in the image-storing pixel 221 of FIG. 14, and a signal charge is transferred from the signal line p2str to the storage capacitor C-str via the transistor TR4.

After the read-out pulse is supplied, a reset pulse is supplied to the reset pulse supply line rst-p. The reset pulse is applied to the gate of the transistor TR3 in the imaging pixel 211 of FIG. 13, thereby resetting the photodiode PD.

With such an operation, the signal charges of the imaging pixels 211 in each of the lines PDR1 to PDR16 in the imaging section 201 are all transferred to the image-storing pixels 221 of the corresponding one of the lines STR1 to STR16 in the storage section 202.

Figure 18:
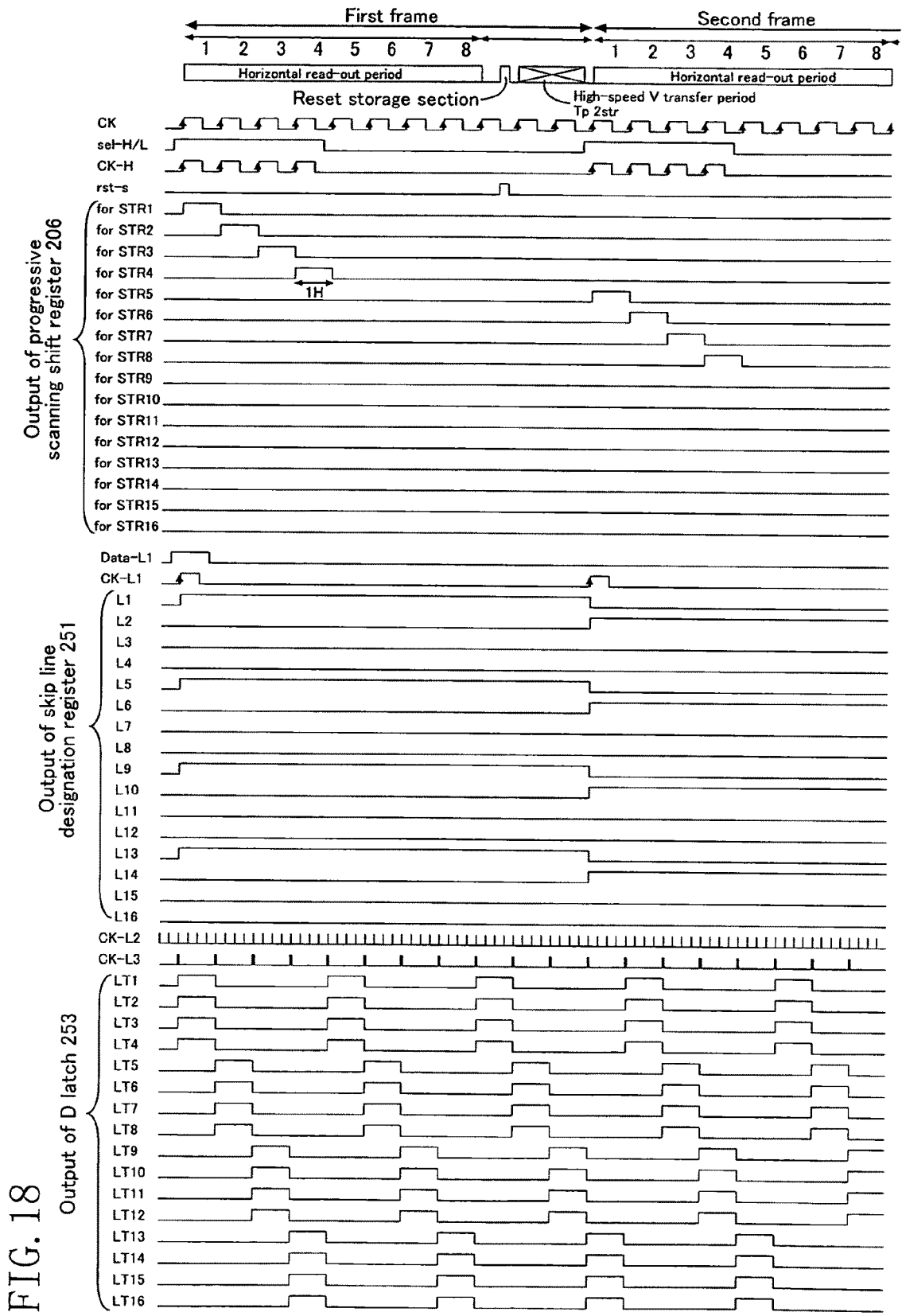
FIG. 18 is a timing diagram showing the operation during the horizontal read-out period of FIG. 16.

FIG. 18 is a timing diagram showing the operation in the horizontal read-out period and the storage section resetting period. In FIG. 18, the clock CK is supplied from the timing generation circuit 212. In the horizontal read-out period of the first frame, the shift clock CK-H, which is cut out from the clock CK by the selection signal sel-H/L, is given to the progressive scanning shift register 206. Receiving the shift clock CK-H and the shift data Data-H (not shown) supplied from the timing generation circuit 212, the progressive scanning shift register 206 outputs the read-out pulse toward the lines STR1 to STR4. In the horizontal read-out period of the second frame, the progressive scanning shift register 206 outputs the read-out pulse toward the lines STR5 to STR8.

As shown in FIG. 15, the skip scanning shift register 205 includes the skip line designation register 251 for determining the lines to be skipped in the frame, and the group-of-lines scanning shift register 252 for scanning a plurality of lines with the same phase. First, the skip line designation register 251 receives the clock CK-L1 from the timing generation circuit 212 and skip line selection data Data-L1, and brings those of the outputs L1 to L16 corresponding to lines to be skipped in the frame to "H". In the first frame, L1, L5, L9 and L13 are turned "H".

Next, the group-of-lines scanning shift register 252 receives the data shift clock CK-L2 from the timing generation circuit 212 and the data Data-L2. It is assumed herein that the data Data-L2 is data whose period is equal to four cycles of the data shift clock CK-L3 and whose level is "H" during one cycle (corresponding to four pulses of the data shift clock CK-L2) and "L" during the following three cycles. Thus, the outputs LT1 to LT16 of the D latches 253 are as shown in FIG. 18. AND gates 254 output signals representing the logical products between the outputs L1 to L16 of the skip line designation register 251 and the outputs LT1 to LT16 of the D latches 253, respectively. The output signals from the AND gates 254 are each a read-out pulse.

Figure 19:
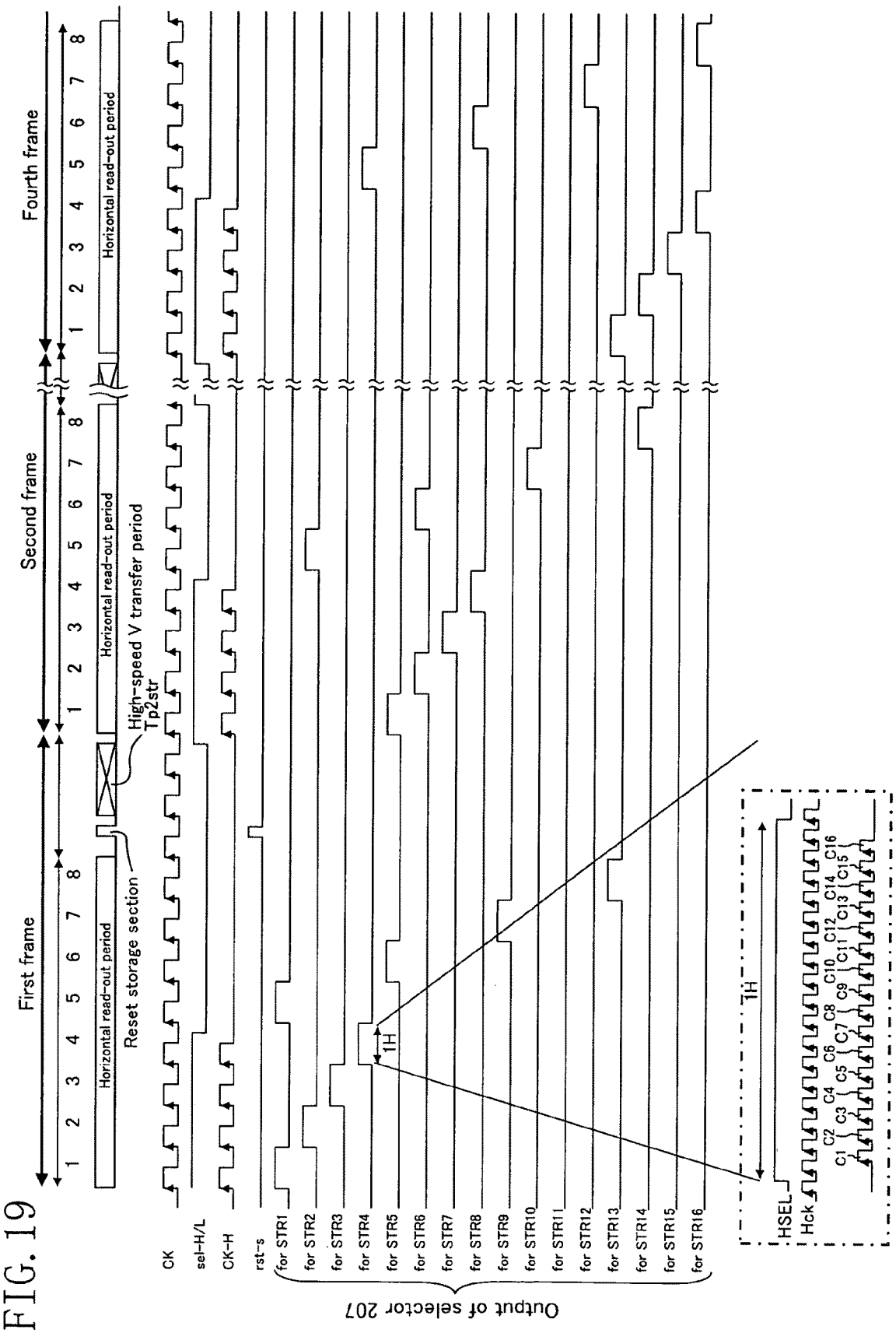
FIG. 19 is a timing diagram showing the output of a selector of FIG. 12.

FIG. 19 is a timing diagram showing the output of the selector 207. The selector 207 selects the output of the progressive scanning shift register 206 when the selection signal sel-H/L is at "H", and selects the output of the skip scanning shift register 205 when the selection signal sel-H/L is at "L". Thus, as a result of the series of operations shown in FIG. 18, outputs as shown in FIG. 19 are obtained for the lines STR1 to STR16.

The number of lines to be skipped can be changed by changing the data Data-L2, the data shift clock CK-L2 and the data shift clock CK-L3, which are output from the timing generation circuit 212. The number of consecutive lines to be scanned in the progressive scanning operation can be changed by changing the "H" period of the selection signal sel-H/L, which is also output from the timing generation circuit 212. Thus, the number of lines to be skipped and the number of consecutive lines to be scanned in the progressive scanning operation are not dictated by the circuit configuration, but the mode of operation can freely be set, allowing for the operation with a high degree of freedom, in the present embodiment.

The operation of reading out one line in the horizontal read-out period is performed as follows. The horizontal shift register 210 receives a one-horizontal-period selection signal HSEL and the horizontal transfer clock Hck supplied from the timing generation circuit 212, and in response supplies pulses to the transistors C1 to C16 of the group of select transistors 209 one after another. As a result, the signal charges stored in the storage capacitors C-str of the image-storing pixels 221 are successively transferred from the lines STR1 to STR16 as they are selected by the output of the selector 207 to an external signal processing circuit (not shown) via the output amplifier 211, thus completing the read-out operation.

Referring back to the configuration of FIG. 8, the pixel values progressively read out from the multi-pixel-resolution imaging section 102 are temporarily stored in the high-resolution window memory 105 as the high-resolution image HWF(t). The pixel values read out in a skip read-out operation from the multi-pixel-resolution imaging section 102 are sub-sampled to ¼ in the H direction by the sub-sampling circuit 115 and then temporarily stored in the low-resolution frame memory 103 as one frame screen. The sub-sampling process is realized by allowing only pixel values of the pixel numbers (2,6,10,14) in the H direction to pass while discarding the other pixel values in the example of FIGS. 10 and 11.

With the read-out operation of FIG. 10 as it is, the low-resolution image in the window region of the frame will be dropped. In view of this, the downward resolution conversion section 106 performs an image process such as a sampling process for the high-resolution image HWF(t), and stores the resulting image at the corresponding position in the low-resolution frame memory 103. With the example of FIG. 10, for example, particular pixels at the positions of coordinates (V,H)=(2,3), (6,3), (10,3) and (14,3) can be sampled with the bottom side of the window region being the reference point (origin) in the V direction.

The low-resolution image LF(t), which has been sub-sampled to ¼×¼ and stored in the low-resolution frame memory 103, is successively recorded by a low-resolution video data recording section 104 frame by frame. The process may or may not employ a video data compression scheme known in the art.

The luminance component of the high-resolution image HWF(t) stored in the high-resolution window memory 105 is input to the texture conversion section 107, and is converted to a luminance image texture feature by a multi-resolution conversion such as wavelet transform. The luminance component of the low-resolution image output from the downward resolution conversion section 106 is input to the image size correction/texture conversion section 112. In the image size correction/texture conversion section 112, the low-resolution image is once converted back to the same number of pixels as the high-resolution image and then subjected to a multi-resolution conversion such as a wavelet transform, thereby obtaining a luminance image texture feature. The method for correcting the image size may be of any type, including bilinear interpolation, bicubic interpolation, and the like. The image size correction method used in this process is used as a pre-process when performing the resolution increasing process on the low-resolution image for displaying the video data with a high resolution.

Figure 20:
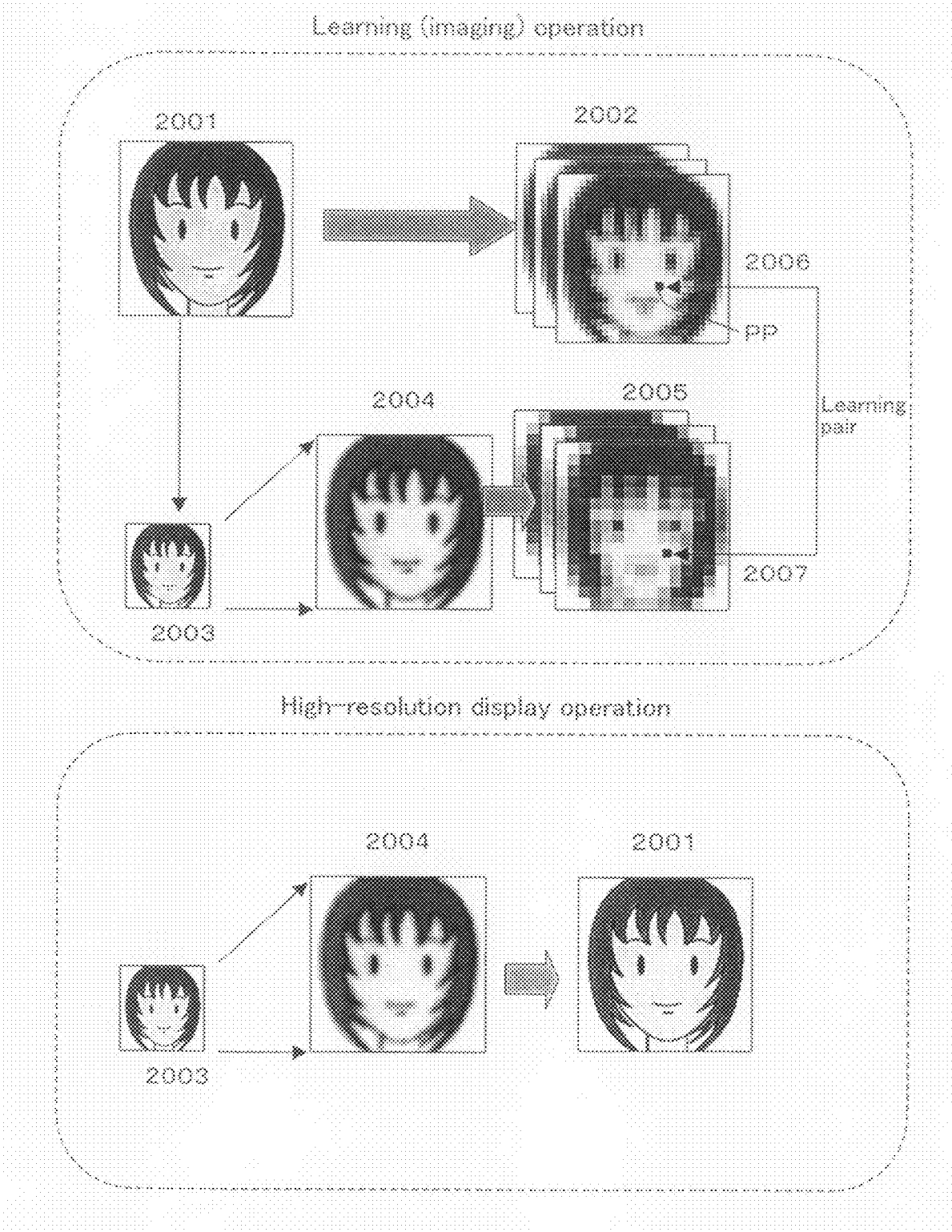
FIG. 20 conceptually shows a texture conversion process according to the first embodiment of the present invention.

FIG. 20 conceptually shows the texture conversion process. Referring to FIG. 20, an image 2001 is a high-resolution image in the window region, which is in a square shape in the illustrated example. An image 2002 is a wavelet coefficient image made up of a plurality of levels obtained by performing the wavelet transform operation on the high-resolution image 2001. An image 2003 is a low-resolution image, an image 2004 is an image obtained by performing a pixel size correction process on the image 2003 to match the number of pixels with that of the high-resolution image 2001, and an image 2005 is a wavelet coefficient image obtained from the image 2004. Where the image 2001 and the image 2004 are referred to as a sharpened image and a blurred image, respectively, reference numerals 2006 and 2007 are texture feature quantities having a $16^{th}$-order component at the pixel position PP in the sharpened image 2001 and in the blurred image 2004, respectively.

During the learning (video recording) process, the process learns the correlation between the texture feature quantities 2006 and 2007 to thereby obtain, as the resolution increasing parameter, a conversion rule for converting the texture feature 2007 of a lower resolution to the texture feature 2006 of a higher resolution. Then, in the resolution increasing process, the received low-resolution image 2003 is subjected to a pixel size correction process to obtain the blurred image 2004, to which the learned resolution increasing parameter is applied to thereby obtain the high-resolution image 2001. In the illustrated example, the resolution increasing process is performed by using the image, which is the source of the learning process, and therefore an ideal resolution increasing process is realized. In practice, the process deals with unlearned images, and it is not always possible to restore an ideal high-resolution image. Nevertheless, in the present invention, the resolution increasing parameter is learned in the window region, accounting for a portion of the object, during the video recording process, whereby it is possible to realize a resolution increasing process of a much higher precision than a method in which the resolution increasing parameter is obtained by leaning a similar object in advance.

The texture learning section 108 learns the correlation between the texture conversion section 107 and the texture feature output from the image size correction/texture conversion section 112 to create an analysis code book and a reproduction code book and produce the resolution increasing parameter. The method will now be described with reference to FIG. 21.

It is assumed herein that the blurred image and the sharpened image are each made up of 100 pixels. Each pixel of the blurred image and the sharpened image is converted to a multi-resolution vector, to thereby obtain multi-resolution vectors U1 to U100 and V1 to V100. The vectors U1 to U100 and the vectors V1 to V100 are in such a relationship that each of them is of the same pixel position as its counterpart. Therefore, the code book can be produced so that when a vector U is input, a corresponding vector V is output. In practice, however, the multi-resolution vectors are classified into representative vectors by a vector quantization process.

Figure 21:
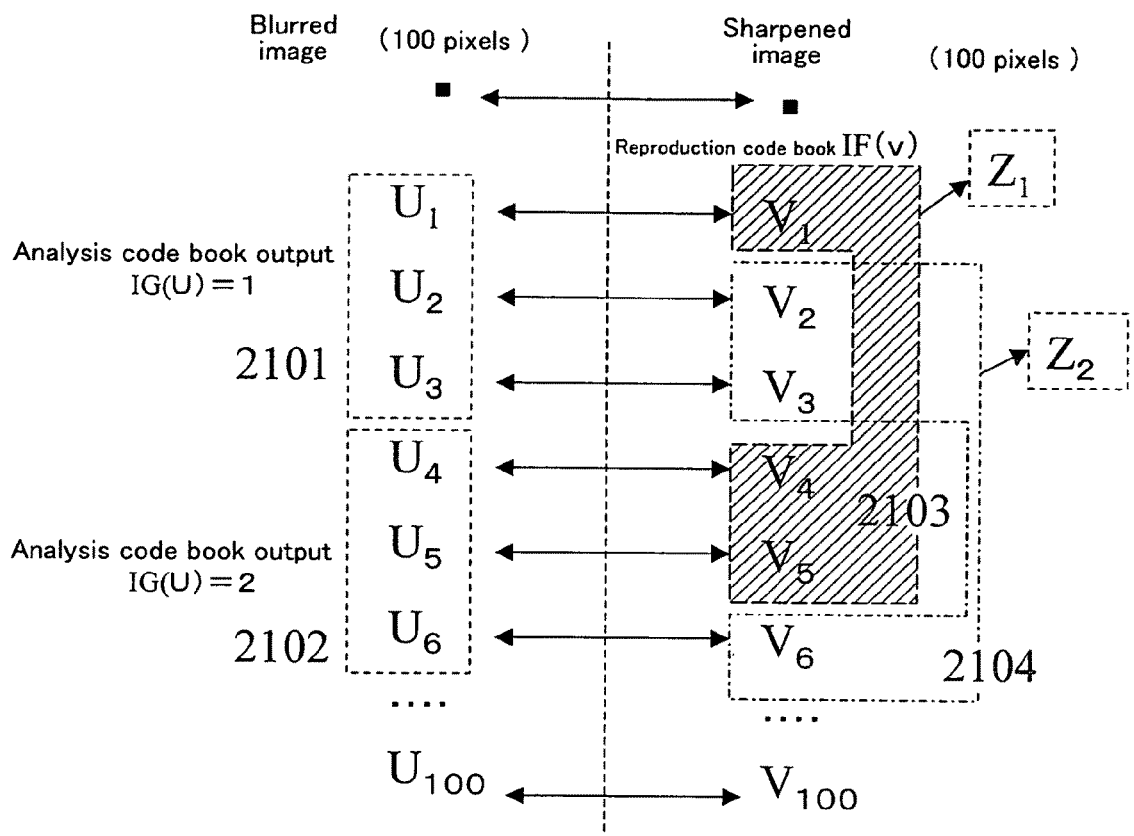
FIG. 21 shows a method for producing an analysis code book and a reproduction code book.

In the example of FIG. 21, the vectors U are quantized into two types 2101 and 2102, and the vectors V into two types 2103 and 2104. A quantization index of the analysis code book or the reproduction code book is the number assigned to a set of vectors obtained by the quantization process. Looking up in the code book means to input a vector number V to obtain a number 1 or 2, which designates a set of vectors obtained by the quantization process. A quantized set 2103 is assigned a representative vector Z1, and the quantized set 2104 a representative vector Z2. A representative vector for a quantized set is calculated by, for example, taking an average value or a representative value of the vectors belonging to that quantized set. In the present invention, the code book as described above is calculated for each frame as a function of time t, thus obtaining the resolution increasing parameter P(t).

Next, the process produces an analysis code book IG for outputting a quantization index (1 or 2) in response to a vector number, and a reproduction code book IF for outputting a reproduction vector for an input quantization index (1 or 2). By using the produced analysis code book and reproduction code book in combination with each other, it is possible to convert a multi-resolution vector of a blurred image to that of a sharp image.

The obtained analysis code book and reproduction code book are stored as the resolution increasing parameter DP by the resolution increasing parameter recording section 109.

Figure 22:
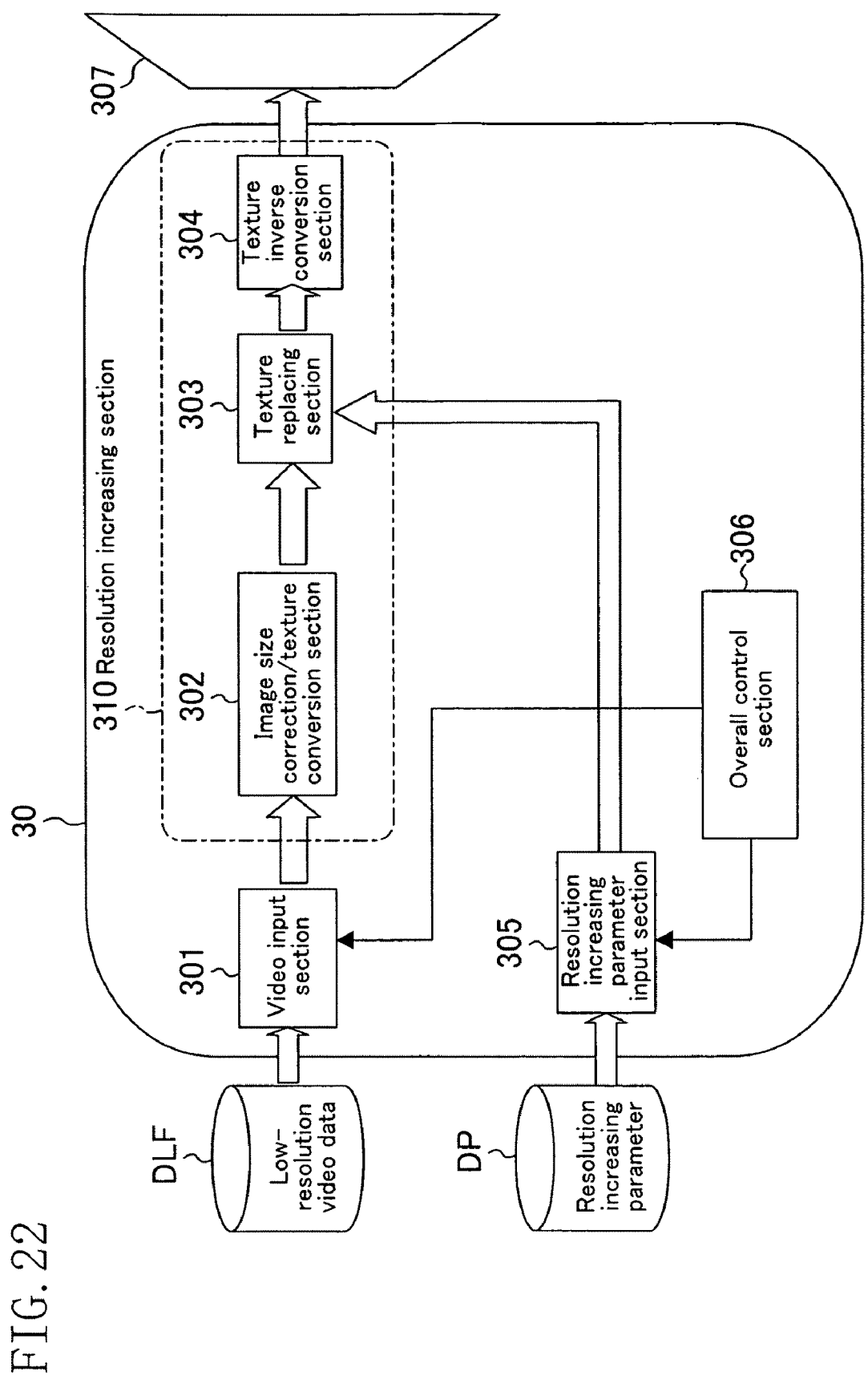
FIG. 22 shows a configuration of an image display section according to the first embodiment of the present invention.

FIG. 22 shows a configuration of an image display section of the present embodiment. The configuration of FIG. 22 has a function of displaying, with a high resolution, video data recorded by an image processing device such as a camcorder of FIG. 8. For example, the image display section is implemented as a display section of the camcorder or provided in a portable display device or a household large-screen TV set. An image display section 30 of FIG. 22 includes a video input section 301, an image size correction/texture conversion section 302, a texture replacing section 303, a texture inverse conversion section 304, a resolution increasing parameter input section 305, an overall control section 306 and a display 307. The image size correction/texture conversion section 302, the texture replacing section 303 and the texture inverse conversion section 304 together form a resolution increasing section 310.

First, the low-resolution video data DLF and the resolution increasing parameter DP recorded by the image processing device 10 of FIG. 8 are input to the image display section 30 via a network or via various other media. The overall control section 306 sends a command to a video data input section 301, and the video data input section 301 receiving the command expands and reads out the compressed low-resolution video data DLF, for example. It is assumed herein that the video data is ordinary color video data, and therefore a YCrCb luminance-color difference signal is produced. The read-out image is of a low resolution whose pixel size is ¼×¼ of the original high-resolution image. Therefore, the image size correction/texture conversion section 303 then enlarges the image size to 4×4 to obtain a blurred image, and performs a texture conversion process independently on the luminance component Y and the color difference component CrCb. This operation is similar to the image size correction/texture conversion section 112 of FIG. 8, and will not be further described below.

Next, the overall control section 306 sends a command to the resolution increasing parameter input section 305, and the resolution increasing parameter input section 305 receiving the command reads out the resolution increasing parameter DP and inputs the parameter to the texture replacing section 303. By using the analysis code book and the reproduction code book described in the resolution increasing parameter in combination with each other, the texture replacing section 303 converts a multi-resolution vector (texture feature) representing the texture of a blurred image to a multi-resolution vector representing the texture of a sharp image. Then, the texture inverse conversion section 304 converts the sharp image texture feature to a resolution-increased luminance image. Then, the resolution-increased luminance Y image and the original color difference CrCb image are input to the display 307, and the high-resolution image is displayed as video data.

The above description is based on the principle that color video data is separated into luminance/color difference components YCrCb, and the resolution of each component is increased independently. Note however that the present invention is not limited to this, but may employ a method in which color video data is separated into RGB components, which are subjected to the resolution increasing process independently, or a method in which a black-and-white image having only the luminance component is subjected to the resolution increasing process.

In the present embodiment, it is possible to produce and display a high-resolution video data from a recorded low-resolution video data, as described above, whereby the amount of information needed to be stored when the camera records the video is small, and there is no need to use a power-consuming super speed imaging device for recording high-resolution video data. Thus, the present invention is applicable to a super-small video camera having limitations on the amount of power that can be consumed. As a result, the present invention provides significant advantages that video data recorded by a super-small video camera can be displayed on an enlarged scale with a high image quality on a large-screen display, and that a portion of the image of interest can be further enlarged.

INDUSTRIAL APPLICABILITY

With the imaging device of the present invention, when obtaining multi-pixel-resolution video data, it is possible to obtain information of the high-resolution image portion for the entire frame, or to improve the image quality of the low-resolution image portion. Therefore, it is effective in, for example, an image process in which a resolution conversion rule is learned by using a high-resolution image so as to perform a resolution increasing process on video data.

The invention claimed is:

1. An imaging device, comprising:
   an imaging section including imaging pixels arranged in a two-dimensional arrangement for photoelectric conversion of incident light;
   a storage section including image-storing pixels arranged in a two-dimensional arrangement, each image-storing pixel corresponding to one of the imaging pixels;
   a transfer section for transferring a charge occurring in each of the imaging pixels to a corresponding one of the image-storing pixels as a signal; and
   an output section for reading out the signal from each of the image-storing pixels,
   wherein:
   the output section includes:
      a progressive scanning shift register for producing a read-out pulse to be supplied to a first region being a row-wide portion of the storage section; and
      a skip scanning shift register for producing a read-out pulse to be supplied to intermittently-selected rows in a second region including an entire region other than the first region,
      wherein the output section is configured so that for the first region, a read-out pulse produced by the progressive scanning shift register is used to perform a progressive read-out operation of reading out signals from all rows of image-storing pixels, and for the second region, a read-out pulse produced by the skip scanning shift register is used to perform a skip read-out operation of reading out signals from intermittently-selected rows of image-storing pixels, and pixel signals of the first region and pixel signals of the second region are read out in combination; and
   the progressive scanning shift register produces the read-out pulse so that the first region continuously moves every frame and the first region scans an entire region of the storage section over a plurality of frames.

2. The imaging device of claim 1, wherein the skip scanning shift register produces the read-out pulse so that positions of the intermittently-selected rows move every frame.

3. The imaging device of claim 1, further comprising a reset register for resetting charges stored in the storage section every frame.

4. The imaging device of claim 1, wherein the second region includes the first region.

5. The imaging device of claim 1, wherein the imaging section captures image with a constant exposure time.

* * * * *

UNITED STATES PATENT AND TRADEMARK OFFICE
CERTIFICATE OF CORRECTION

| | | |
|---|---|---|
| PATENT NO. | : 7,623,174 B2 | Page 1 of 1 |
| APPLICATION NO. | : 11/990589 | |
| DATED | : November 24, 2009 | |
| INVENTOR(S) | : Katsuhiro Kanamori et al. | |

It is certified that error appears in the above-identified patent and that said Letters Patent is hereby corrected as shown below:

On the title page, insert the following between items (65) and (51):

-- (30)    Foreign Application Priority Data

Sep. 9, 2005    (JP) ............................ 2005-262610 --

Signed and Sealed this
Twenty-ninth Day of November, 2011

David J. Kappos
*Director of the United States Patent and Trademark Office*